(12) United States Patent
Schill et al.

(10) Patent No.: US 7,918,328 B2
(45) Date of Patent: Apr. 5, 2011

(54) METHOD AND APPARATUS FOR BOTTLE RECIRCULATION

(75) Inventors: Joseph G. Schill, Lynchburg, VA (US); Harold James Marshall, Forest, VA (US)

(73) Assignee: Belvac Production Machinery, Inc., Lynchburg (DE)

( * ) Notice: Subject to any disclaimer, the term of this patent is extended or adjusted under 35 U.S.C. 154(b) by 0 days.

(21) Appl. No.: 12/656,099

(22) Filed: Jan. 15, 2010

(65) Prior Publication Data

US 2010/0116622 A1    May 13, 2010

Related U.S. Application Data

(62) Division of application No. 11/692,584, filed on Mar. 28, 2007.

(60) Provisional application No. 60/787,502, filed on Mar. 31, 2006.

(51) Int. Cl.
*B21D 51/26* (2006.01)

(52) U.S. Cl. .................. 198/459.2; 198/836.3; 198/450; 198/689.1; 72/356

(58) Field of Classification Search ............... 198/689.1, 198/836.3, 836.4, 450, 459.2; 72/356
See application file for complete search history.

(56) References Cited

U.S. PATENT DOCUMENTS

| | | |
|---|---|---|
| 1,621,301 A | 1/1927 | Wright |
| 2,346,376 A | 8/1942 | Heavener |
| 2,686,551 A | 8/1954 | Laxo |
| 2,928,454 A | 3/1960 | Laxo |
| 3,096,709 A | 7/1963 | Eldred et al. |
| 3,621,530 A | 11/1971 | Pflieger et al. |
| 3,983,729 A | 10/1976 | Traczyk et al. |
| 4,030,432 A | 6/1977 | Miller et al. |
| 4,102,168 A | 7/1978 | Brookes et al. |
| 4,207,761 A | 6/1980 | Niemi |
| 4,513,595 A | 4/1985 | Cvacho |
| 4,697,691 A | 10/1987 | Zodrow et al. |

(Continued)

FOREIGN PATENT DOCUMENTS

CA    2 536 841    3/2005

(Continued)

OTHER PUBLICATIONS

Applicants inform the PTO that an offer for sale was made more than one year before the date of this application of a device requested by the attached Figure ("Exhibit A"). Additional information is available upon request.

(Continued)

*Primary Examiner* — Mark A Deuble
(74) *Attorney, Agent, or Firm* — Foley & Lardner LLP

(57) ABSTRACT

A machine arrangement that operates on a plurality of articles, such as bottles, includes a plurality of machines arranged in a machine arrangement. At least one of the machines includes an apparatus configured to modify the articles by at least one of moving, holding, manipulating and shaping the articles as they pass from an article infeed to an article discharge of the machine arrangement. A recirculation mechanism moves articles from a downstream machine after a first pass (or run) and recirculates the articles back to an upstream machine in a second (recirculation) pass (or run) so that the articles, which are recirculated through the second pass are again subjected to a different machine modifying operation in at least one machine that the articles have previously passed in the first pass. The articles move continuously through the first and second passes while being subjected to at least one machine modifying operation.

14 Claims, 17 Drawing Sheets

U.S. PATENT DOCUMENTS

| | | | |
|---|---|---|---|
| 4,892,184 | A | 1/1990 | Vander et al. |
| 5,704,240 | A | 1/1998 | Jordan |
| 5,762,174 | A | 6/1998 | Risley et al. |
| 6,050,396 | A | 4/2000 | Moore |
| 6,055,836 | A | 5/2000 | Waterworth et al. |
| 6,176,006 | B1 | 1/2001 | Milliman et al. |
| 6,199,420 | B1 | 3/2001 | Bartosch |
| 6,233,993 | B1 | 5/2001 | Irie |
| 6,378,695 | B1 | 4/2002 | Rinne |
| 6,467,322 | B2 | 10/2002 | Nogami et al. |
| 6,644,083 | B2 | 11/2003 | Pakker |
| 6,672,122 | B2 | 1/2004 | Mustread et al. |
| 6,779,651 | B1 | 8/2004 | Linglet et al. |
| 7,464,573 | B2 | 12/2008 | Shortridge |
| 7,530,445 | B2 | 5/2009 | Mdrshall et al. |
| 2005/0193796 | A1 | 9/2005 | Heiberger et al. |
| 2007/0017089 | A1 | 1/2007 | Hosoi |
| 2007/0227218 | A1 | 10/2007 | Shortridge |
| 2007/0227320 | A1 | 10/2007 | Marshall |
| 2007/0227859 | A1 | 10/2007 | Marshall et al. |
| 2007/0249424 | A1 | 10/2007 | Marshall et al. |
| 2007/0251803 | A1 | 11/2007 | Schill et al. |
| 2008/0282758 | A1 | 11/2008 | Shortridge et al. |

FOREIGN PATENT DOCUMENTS

| | | |
|---|---|---|
| DE | 1 939 623 | 2/1970 |
| DE | 101 56 085 | 5/2003 |
| FR | 2 881 123 | 7/2006 |
| GB | 07306 | 3/1898 |
| JP | 2002-102968 | 4/2002 |
| JP | 2003-237752 | 8/2003 |
| JP | 2003-251424 | 9/2003 |
| JP | 2003-252321 | 9/2003 |
| JP | 2003-320432 | 11/2003 |
| JP | 2004-002557 | 1/2004 |
| JP | 2004-130386 | 4/2004 |
| JP | 2004-160468 | 6/2004 |
| JP | 2004-217305 | 8/2004 |
| JP | 2005-022663 | 1/2005 |
| JP | 2006-176140 | 7/2006 |
| JP | 2006-176183 | 7/2006 |
| WO | WO-94/12412 | 6/1994 |
| WO | WO-96/33032 | 10/1996 |
| WO | WO-97/37786 | 10/1997 |
| WO | WO-97/49509 | 12/1997 |
| WO | WO-2005/023450 | 3/2005 |
| WO | WO-2006-067901 | 6/2006 |
| WO | WO-2006/095215 A1 | 9/2006 |

OTHER PUBLICATIONS

USPTO Final Office Action dated Dec. 29, 2010 received in the related application of U.S. Appl. No. 11/581,787, filed Oct. 17, 2006 in the name of Harold James Marshall.

USPTO Final Office Action dated Mar. 2, 2010 received in the related application of U.S. Appl. No. 11/643,935, filed Dec. 22, 2006 in the name of Jeffrey L. Shortridge.

Office action dated Mar. 10, 2010 received in related U.S. Appl. No. 11/692,584.

USPTO Notice of Allowance on U.S. Appl. No. 11/692,564 dated Nov. 5, 2010; 13 pages.

USPTO Notice of Allowance on U.S. Appl. No. 11/692,584 mailed Sep. 20, 2010; 7 pages.

Supplemental Notice of Allowance dated Apr. 13, 2009 in U.S. Appl. No. 11/643,950; 3 pages.

PCT International Search Report on International Application No. PCT/JP2007/007958 mailed Oct. 11, 2007; 4 pages.

PCT International Search Report on International Application No. PCT/US2007/007831 mailed Sep. 19, 2007; 2 pages.

PCT International Search Report on International Application No. PCT/US2007/007832 mailed Sep. 27, 2007; 3 pages.

PCT International Search Report on International Application No. PCT/US2007/007957 mailed Sep. 19, 2007; 2 pages.

PCT International Search Report on International Application No. PCT/US2007/007959 mailed Sep. 5, 2007; 2 pages.

PCT International Search Report on International Application No. PCT/US2007/007960 mailed Sep. 6, 2007; 2 pages.

US Office Action on U.S. Appl. No. 11/643,935 dated Aug. 31, 2010; 7 pages.

USPTO Final Office Action on U.S. Appl. No. 11/692,564 mailed Jul. 01, 2009; 7 pages.

USPTO non-final office action on U.S. Appl. No. 11/581,787 mailed Jun. 17, 2009; 12 pages.

USPTO Non-final Office Action on U.S. Appl. No. 11/643,934 mailed Mar. 17, 2008; 14 pages.

USPTO Non-final Office Action on U.S. Appl. No. 11/643,935 mailed Aug. 28, 2009; 14 pages.

USPTO Non-final Office Action on U.S. Appl. No. 11/643,950 mailed Aug. 11, 2008; 10 pages.

USPTO Non-final office action on U.S. Appl. No. 11/692,564 mailed Dec. 23, 2009; 9 pages.

USPTO Non-final Office Action on U.S Appl. No. 11/692,564 mailed Dec. 31, 2008; 15 pages.

USPTO Non-final Office Action on U.S. Appl. No. 11/692,564 mailed Jun. 21, 2010; 9 pages.

USPTO Notice of Allowance and Fees Due on U.S. Appl. No. 11/643,950 mailed Dec. 4, 2008; 4 pages.

USPTO Notice of Allowance and Fees Due on U.S. Appl. No. 11/692,584 mailed Jun. 25, 2010; 10 pages.

USPTO Notice of Allowance on U.S. Appl. No. 11/581,787 mailed Apr. 19, 2010; 4 pages.

USPTO Notice of Allowance on U.S. Appl. No. 11/581,787 mailed Jun. 23, 2010; 4 pages.

USPTO Notice of Allowance on U.S. Appl. No. 11/643,934 mailed Sep. 24, 2008; 6 pages.

METHOD AND APPARATUS FOR BOTTLE RECIRCULATION

CROSS-REFERENCE TO RELATED PATENT APPLICATIONS

This application is a divisional of U.S. application Ser. No. 11/692,584, filed Mar. 28, 2007, which claims the benefit under 35 U.S.C. §119(e) of U.S. Provisional Application No. 60/787,502, filed Mar. 31, 2006, both of which are incorporated herein by reference in their entirety.

BACKGROUND

The present invention relates generally to the field of machine arrangements for processing articles, such as bottles. More specifically, the invention relates to a machine arrangement that is configured to recirculate articles so that the articles may undergo additional operations without the need for a long and space consuming machine arrangement.

Conventional machine arrangements are strictly linear and are generally referred to as machine lines. That is, the machine lines, with each and every processing and/or forming machine, extend in a single line such that articles operated on in the machine line only move through the machine arrangement in a single pass. Such a set up may take up a large amount of space in a warehouse, factory, or other location. Occasionally, buildings are not sufficiently large or long to house complex and long machine arrangements. For example, in bottle or can operations, many different types of processes need to be performed on the bottle or can, such as necking, curling, expansion, trimming, etc. Each type of process may also require a plurality of machines in order to sufficiently perform the necessary process. For instance, necking operations may require multiple operations with multiple machines in order to properly neck a bottle or can that is of a certain length or size.

Furthermore, the conventional straight and single pass machine lines may be more costly. The conventional machine lines may need to include duplicate or additional machines in order to perform the desired function(s).

SUMMARY

In an embodiment of the invention, a machine arrangement which operates on a plurality of articles is provided. The machine arrangement comprises: a plurality of machines arranged to cooperate with each other in a manner to form a machine arrangement, the plurality of machines including an upstream machine and a downstream machine in the machine arrangement, at least one of the machines comprises an apparatus configured to modify the articles in at least one modifying operation as they pass from an article infeed to an article discharge of the machine arrangement; and a recirculation mechanism which moves articles from the downstream machine after a first pass through the machine arrangement and recirculates the articles back to the upstream machine in a recirculation pass so that the articles which are recirculated through the recirculation pass are again subjected to a different modifying operation in a machine that the articles have previously passed through in the first pass. The recirculation mechanism comprises an article guide track which transfers the articles from the downstream to the upstream one of the machine, the article guide track comprising a track width adjusting arrangement that adjusts the track width of the article guide track to accommodate varying article sizes.

Another embodiment of the invention provides an article processing arrangement. The arrangement comprises a plurality of article processing machines. The machines each comprise an upstream machine and a down stream machine in the article processing arrangement. The arrangement comprises: an operation star wheel for holding articles, each star wheel including a number of pockets for receiving and holding the articles during processing operations, the pockets being divided into first and second pockets and arranged so that each first pocket is arranged between two second pockets; a transfer star wheel associated with the operation star wheel, the transfer star wheel having a plurality of pockets equal in number to the total of the first and second pockets formed in the operation star wheel, the pockets being arranged in a manner so that articles in the first and second pockets of the operation star wheel are respectively transferred into first and second pockets of the transfer star wheel; an infeed supply for supplying articles only into the first pockets of the operation star wheel; a recirculation supply for recirculating articles which have been introduced into the first pockets and transferred to the transfer star wheel back to the operation star wheel, the recirculation supply configured to introduce the articles into the second pockets on the operation star wheel; a discharge for discharging articles from the second pockets of the transfer star wheel; and an article guide track which transfers the articles from the downstream to the upstream one of the machines to transfer the articles to the recirculation supply. The article guide track comprising a track width adjusting arrangement that adjusts the track width of the article guide track to accommodate varying article sizes.

According to yet another embodiment, a machine arrangement which operates on a plurality of articles is provided. The machine arrangement comprises: a plurality of machines arranged to cooperate with each other in a manner to form a machine arrangement, the plurality of machines including an upstream machine and a downstream machine, at least one of the machines comprising a means for modifying the articles by at least one of moving, holding, manipulating, and shaping the articles as they pass from an article infeed to an article discharge of the machine arrangement and move along a path having a predetermined configuration; a means for recirculating articles within the machine arrangement, the means for recirculating articles moves articles from the downstream machine after a first pass and recirculates the articles back to the upstream machine in a recirculation path so that the articles which are recirculated through the recirculation pass are subjected to a variation of the at least one machine with means for modifying the articles that the articles have previously passed through in the first pass; means for applying lubrication to the articles entering the machine arrangement at the article infeed; and means for applying lubrication to the articles in the recirculation pass.

According to an exemplary embodiment of the invention, a method of recirculating articles is provided. The method comprises method of recirculating articles in a machine arrangement comprises: feeding a plurality of articles to a processing turret into alternating pockets via a primary infeed in a machine arrangement; performing a process on the articles; moving the articles to a second turret or transfer star wheel in the machine arrangement and keeping the articles in corresponding alternating pockets; transferring the articles to a recirculation conveyor; conveying the articles to a recirculation chute; feeding the articles via a secondary infeed to the machine arrangement to alternating pockets opposite from the primary infeed pockets; performing a different process on the articles in the opposite pockets; dividing articles in opposite pockets to send to a discharge and dividing the articles in primary infeed pockets to send to the recirculation conveyor; applying a lubricant to the articles in the primary infeed pockets; and applying a lubricant to the articles in the opposite pockets.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
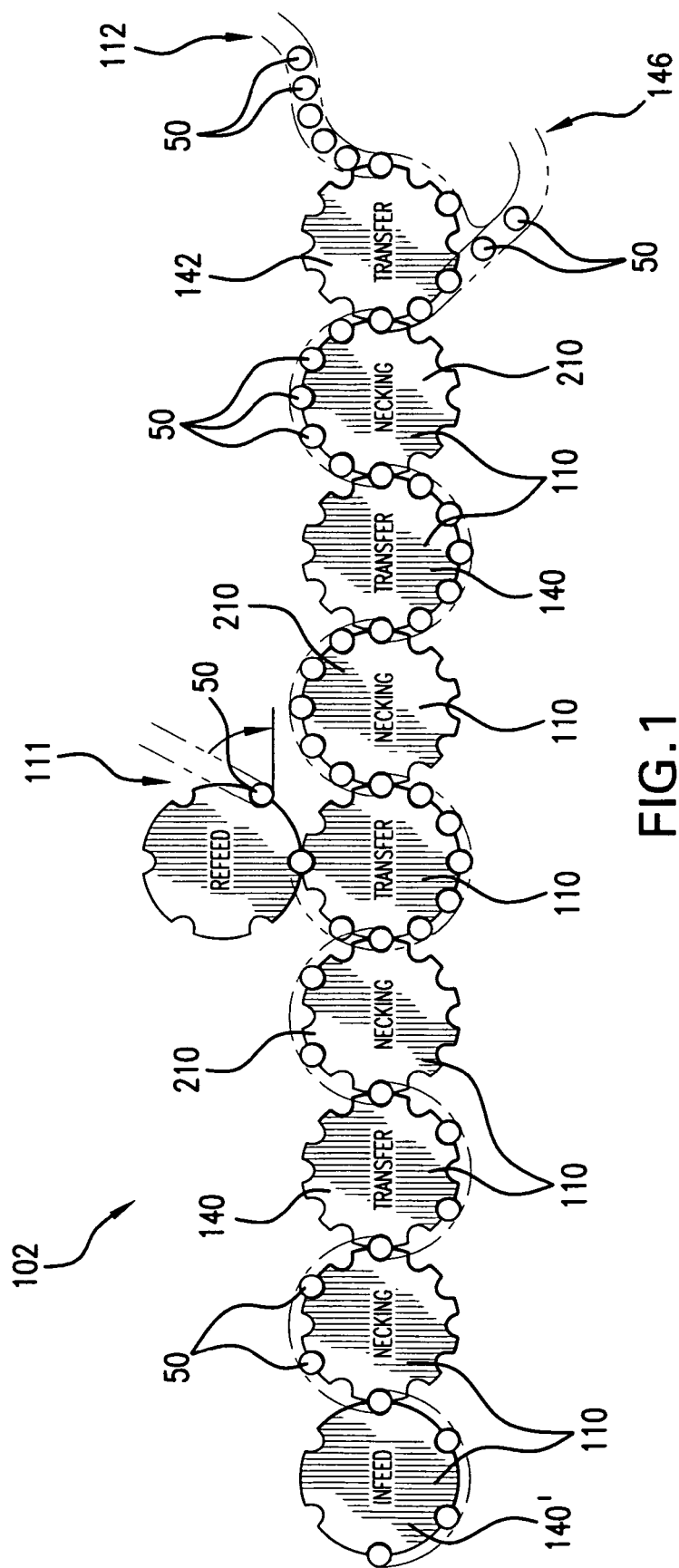
FIG. 1 is a schematic view of a machine arrangement with a recirculation conveyor system according to an embodiment of the invention.
Figure 2:
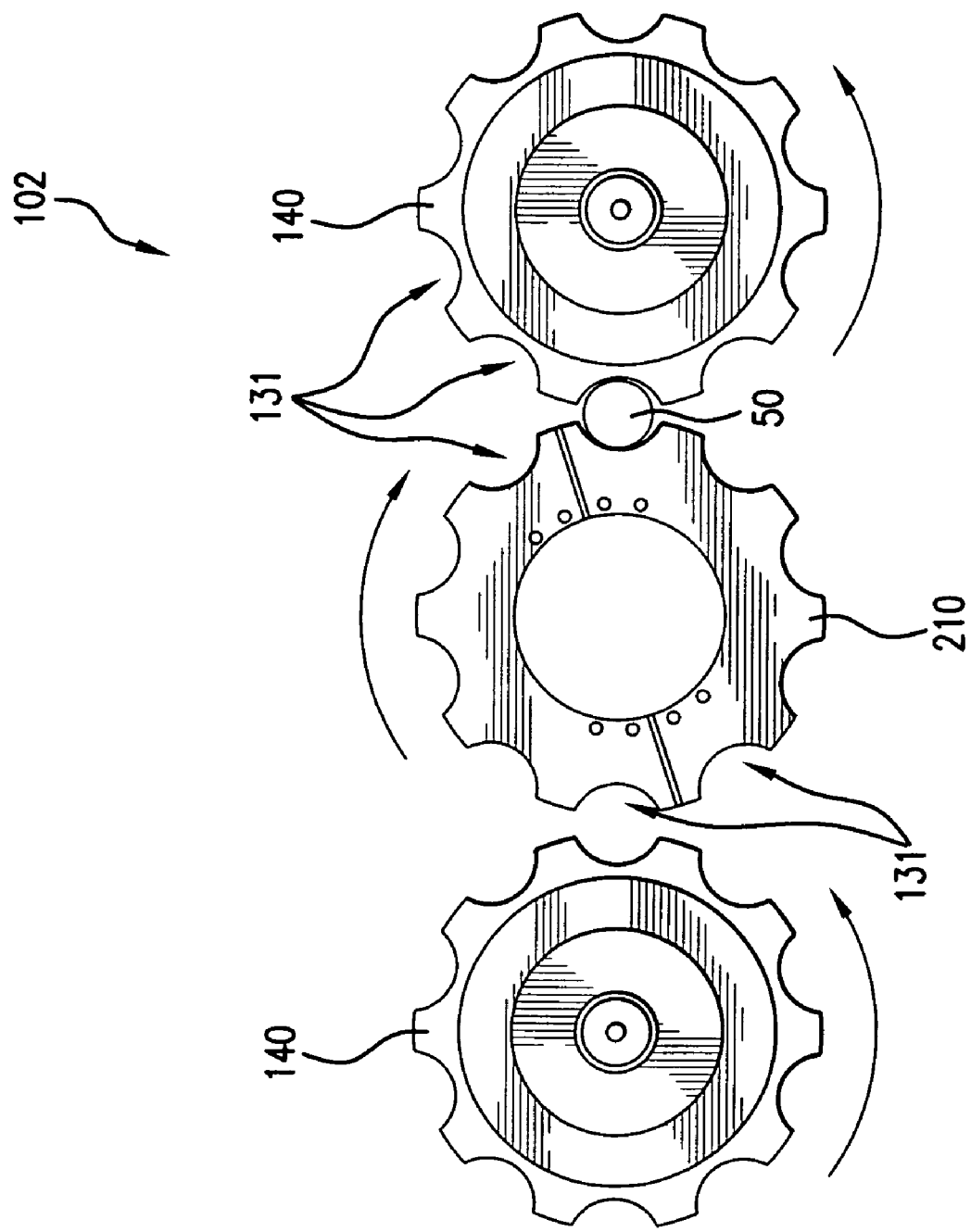
FIG. 2 is a detailed schematic view of the machine arrangement of FIG. 1.

An embodiment of the invention relates to a machine arrangement which operates on a plurality of articles. The machine arrangement comprises a plurality of machines arranged to cooperate with each other in a manner to form a machine arrangement, at least one of the machines comprising an apparatus configured to modify articles by operating at least one of moving, holding, manipulating, and shaping the articles as they pass from an article infeed to an article discharge of the machine arrangement and move along a path having a predetermined configuration. A recirculation mechanism moves articles from a downstream machine after a first pass (or sometimes referred to as a "run" or "path") and recirculates the articles back to an upstream machine in a recirculation (second) pass so that the articles, which are recirculated through the second pass, are again subjected to the at least one machine modifying operation in a selected number of machines that the articles have previously passed through in the first pass. The articles move continuously through the first pass and second pass while being subjected to the at least one machine modifying operations.

In another embodiment, the recirculation mechanism comprises an article guide track which transfers the articles from the downstream to the upstream one of the machines.

In another embodiment, the article guide track comprises a track width adjusting arrangement that uniformly (or, in other words, at the same time) adjusts the width of the article guide track to accommodate varying sizes and/or shapes of articles.

The track width adjusting arrangement, in another embodiment, comprises a rack and pinion arrangement which, upon the turning of a line shaft via a crank wheel, the pinions simultaneously rotate to move the corresponding racks forwards and/or backwards to vary the width of the article guide track. In an embodiment, the pinions are operatively connected to the line shaft and the racks are operatively connected to cantilevered beams of the article guide track.

The track width adjusting arrangement, in another embodiment, comprises a chain and sprocket arrangement which simultaneously rotates threaded members in a manner which varies the width of the article guide track.

In another embodiment, the article guide track includes a vacuum grip to carry the articles through the recirculation path. The vacuum grip is configured to release the articles at a recirculation discharge (supply chute).

According to another embodiment of the invention, a machine arrangement which operates on a plurality of articles, comprises a plurality of machines arranged to cooperate with each other in a manner to form a machine arrangement. At least one of the machines comprises an apparatus configured to modify articles by operating at least one of moving, holding, manipulating, and shaping the articles as they pass from an article infeed to an article discharge of the machine arrangement and move along a path having a predetermined configuration. A recirculation mechanism moves articles from a downstream machine after a first pass and recirculates the articles back to an upstream machine in a recirculation path so that the articles which are recirculated through the second pass are again subjected to the at least one machine modifying operations in a selected number of machines that the articles have previously passed through in the first pass. The machine arrangement further includes a lubrication mechanism configured to apply lubricant over an exterior portion of each article after each article passes through the article infeed and/or a recirculation infeed.

In another embodiment, the machine arrangement includes a lubrication mechanism that is operably connected to a first star wheel located at an end of a recirculation supply chute (sometimes referred to herein as a "recirculation discharge").

In an embodiment, the first star wheel includes a plurality of pockets; at least one pocket includes a roller configured to rotate and apply lubricant to the article in the corresponding pocket.

In another embodiment, an article processing arrangement is provided. The article processing arrangement comprises an article processing machine including an operation star wheel for holding articles. Each star wheel includes a number of pockets for receiving and holding the articles during processing operations. The pockets are divided into alternating first and second pockets and arranged so that each first pocket is arranged between two second pockets. The arrangement further includes a transfer star wheel associated with the operation star wheel. The transfer star wheel includes a plurality of pockets equal in number to the total of the first and second pockets formed in the operation star wheel. The pockets are arranged in a manner so that articles in the first and second pockets of the operation star wheel are respectively transferred into first and second pockets of the transfer star wheel. The arrangement also includes an infeed supply for supplying articles only into the first pockets of the operation star wheel and a recirculation supply for recirculating articles which have been introduced into the first pockets and transferred to the transfer star wheel back to the operation star wheel. The recirculation supply is configured to introduce the articles into the second pockets on the operation star wheel. The arrangement further includes an outfeed for discharging articles from the second pockets of the transfer star wheel. The operation and transfer star wheels are continuously rotatable.

In an embodiment, the arrangement includes a vacuum grip to carry the articles through the recirculation path. The vacuum grip is configured to release the articles at a recirculation supply.

In an embodiment of the arrangement, a lubrication mechanism is operably connected to a first star wheel located at an end of a recirculation supply chute (recirculation discharge).

In one embodiment, the first star wheel includes a plurality of pockets. At least one pocket includes a roller configured to rotate and apply lubricant to the article in the corresponding pocket.

In an embodiment, the arrangement comprises a lubrication mechanism configured to lubricate an exterior portion of each article after each articles passes through the recirculation supply chute.

In another embodiment of the invention, a method of recirculating articles is provided. The method comprises feeding a plurality of articles to a processing turret into alternating primary infeed pockets via a primary infeed in a machine arrangement, performing a process on the articles, moving the articles to a second turret or transfer star wheel in the machine arrangement and keeping the articles is corresponding alternating pockets, and transferring the articles to a recirculation conveyor. The method further comprises conveying the articles to a recirculation chute and feeding the articles via a secondary infeed to the machine arrangement to alternating pockets opposite from the primary infeed pockets. The method also includes performing a process on the articles in the opposite pockets, dividing articles in the opposite pockets to send to a discharge and dividing the articles in primary infeed pockets to send to the recirculation conveyor.

A machine or machine arrangement with multiple stations on turrets that perform substantially similar processes in stages may be reduced in size or number of components by having alternating processes performed on each station of the turret. Each turret includes at least one star wheel, whether an operation star wheel or a transfer star wheel. In order to return the partially processed product back to a processing turret (operation star wheel) or series of turrets, a method of recirculation is required.

The articles (or sometimes referred to herein as a "product") are first fed into a machine in a machine arrangement to fill alternating pockets (or sometimes referred to as a "station") of a star wheel in a turret. The articles are then processed though any number of stages, which can include forming, transferring, or any other suitable type of process stage, which can be performed in any number of turrets or machines. The articles are then discharged to a conveyor, or other suitable discharge mechanism, to be delivered, via a recirculation infeed, to a recirculation supply chute (recirculation discharge) that places each article in the pockets that were not filled by the first infeed operation. The next set of process stages is then performed. When all process stages are complete for an article, that article is discharged from the machine arrangement or directed to other processes in the machine arrangement that are positioned downstream of the recirculation infeed.

According to one embodiment of the invention, the process may include the following: (1) a transfer star wheel, with half the number of pockets as an operation star wheel, feeds articles into a first set of pockets onto a first operation star wheel (sometimes referred to as a "processing star wheel"); (2) a process is performed in alternating pockets on the articles for a number of stages in operation star wheels; (3) the articles arrive at a "divider" star wheel that recirculates the articles that have been through the first series of processes and transfers a first set of articles into a recirculation infeed; (4) a conveyor transports the first set of articles that are to be recirculated to a recirculation supply chute; (5) the recirculation supply chute transfers the articles into a second set of pockets which are opposite from the first set of pockets; (6) the process is continued, such that the articles in the second set of pockets pass through a number of stages on the alternate (second) set of pockets; and (7) the fully circulated articles arrive at the "divider" turret and pass through to be discharged or directed to other processes that are downstream of the recirculation infeed.

According to another embodiment, the process may comprise: (1) an infeed star wheel, with a vacuum mechanism to retain bottles for part of the rotation, feeds bottles onto another star wheel (directly or through an intermediate star wheel as shown); (2) the unprocessed bottles are combined (after some bottles have been partially processed and recirculated) in alternating fashion with partially processed bottles. Vacuum is supplied through passages in the star wheels and timed as necessary to retain or release bottles. The star wheel on which the unprocessed and partially processed bottles are combined may have different timing on alternating pockets. (3) The bottles are then transferred to a processing turret with alternating process tooling in every other station. The bottles may continue for a number of process stages. (4) After the desired number of stages has been completed, the bottles are recirculated. Vacuum is supplied through passages in a "divider" star wheel and timed as necessary to retain or release bottles. Alternating pockets of the "divider" star wheel have different timing. A second star wheel, located above the "divider" star wheel, has vacuum supplied to every other pocket and sends the partially processed bottles onto the recirculating conveyor. (5) The recirculating conveyor retains the bottles with vacuum to lift the bottles up to a track work that conveys the bottles to the second infeed. (6) A star wheel, similar to the first infeed star wheel, places the bottles in the stations not filled by the first infeed, and the bottles are transported and processed in a similar manner as they were in the first set of processes. (7) After the stages of processing are complete, the bottles arrive at the "divider" star wheel, where they continue without being recirculated.

Embodiments of the invention will now be described with reference to the figures.

FIGS. 1-17 illustrate a recirculation conveyor system with a recirculating machine arrangement 102. An article 50 may be a can, any suitable food or beverage container, jar, bottle or any other suitable article. The article 50 has an open end, opposite closed end, and a sidewall extending from the closed end. Alternatively, the article 50 may be open at both ends. A top, lid, or other closure may be added to the article 50 during an operation in the machine arrangement 102, or at a later stage.

For exemplary purposes only, the below description will describe the recirculation conveyor system and method for use on a container 50. It will be recognized that any other type of article 50 (such as that described above) may be used.

Containers 50 are fed into a continuously rotating forming turret (such as turret 210 shown in FIG. 2) either from an infeed track 130 or from a preceding transfer star wheel 140 (sometimes referred to as a "transfer turret"), which may be part of a machine arrangement 102. FIG. 1 illustrates an infeed transfer star wheel 140 passing a container 50 to the continuously rotating forming turret 210 (sometimes referred to herein as an "operation turret" or a "forming turret" or a "forming star wheel") of a bottle forming process. The forming turret 210 may perform any suitable type of forming operation or process on the containers 50. For example, the forming turret 210 may perform a necking, curling, trimming, threading, or any other type of operation.

While the forming turret 210 is rotating with the container 50 loaded into a forming station (sometimes referred to as a "pocket") therein, the container 50 will be inserted into a forming head (not shown) on the forming turret 210 where an open end of the container 50 will be subjected to a forming process and then withdrawn. The container 50 is then transferred from the forming turret 210 onto another transfer star wheel 140 or a discharge track 146, in the direction illustrated by the arrows in FIG. 2. It will be noted that the direction may vary in alternative embodiments.

The transfer star wheels 140, whether preceding a forming turret 210 and/or following a forming turret 210, have similar designs and functions. The preceding star wheel 140 loads the container 50 into the forming turret 210, and the following star wheel 140 unloads the container 50 from the forming turret 210. The container 50 may then be recirculated back to the preceding transfer wheel 140.

According to another embodiment, the machine arrangement and machine sequence 102 can include a recirculation mechanism 103 configured to move the containers 50 from a downstream one of the plurality of modules 110 after a first run (or pass) in the machine arrangement 102 and recirculates the bottles back to an upstream one of the plurality of modules 110 in a recirculation path (on a recirculation conveyor/article guide track 104) so that the containers 50, which are recirculated, pass through a second run (or pass) in the machine arrangement 102 to subject the containers 50 through the operations of the forming turret machines 210 an additional time. When the containers 50 pass through the second run, the containers 50 do not pass through forming operations that are identical to the first run. Rather, the containers 50 in the second pass are in different pockets 131 for different operations. For example, the containers 50 in the second pass are positioned in dies with smaller necking diameters. Alternatively, the containers 50 in the second pass can undergo completely different operations than in the first pass. For example, in the first pass, the containers 50 could undergo necking operations, followed by threading operations in the second pass. In an embodiment, the different operations may be accomplished in the same forming turret machines 210 or in different forming turret machines 210. Alternatively, the containers 50 may undergo a modifying operation in the first pass and, in the second pass, the containers 50 may undergo only a slight variation of the first modifying operation.

It will also be recognized that the machine arrangement 102 could include any suitable number of passes (or runs), such as two, three, four, five, or any other suitable amount. With each additional pass, the forming turrets 210 and transfer star wheels 140 will contain the appropriate number of varying pockets 131. For example, if the machine arrangement 102 includes three passes, then each forming turret 210 and transfer star wheel 140 will have three different pockets: a first set for the first pass, a second set for the second pass, and a third set for the third pass. The sets will alternate as appropriate in the forming turrets 210 and transfer star wheels 140. For example, the pockets 131 will alternate as set one, set two, set three, set one, set two, set three, etc.

The recirculation mechanism 103 includes a recirculation discharge 111 located on an upstream portion of the machine arrangement 102, a recirculation infeed 112 located on a downstream portion of the machine arrangement 102, and a guide track/conveyor 104. Alternatively, the recirculation discharge 111 and recirculation infeed 112 could be located in any suitable location in the machine arrangement.

In one embodiment, the containers 50 are held in position on a first transfer star wheel 140' (and other star wheels or turrets 140, 141, 142, 143, 144, 145) using a pneumatic pressure differential or "suction" by a recirculation mechanism 103.

In an embodiment, the star wheels 140 may be composed of two segments, which are connected to a drive shaft by way of a timing plate. Each timing plate is individually adjustable with respect to the respective turret drive shaft in a manner which allows their angular rotational position with respect to the turret drive shaft to be adjusted and then fixed to the degree that the two segments of the forming turret star wheel 210 which are mounted thereon, are positioned/timed with respect to the transfer star wheels on either side thereof, so that a smooth, continuous, incident-free transfer of bottles between the turret star wheels and the respective transfer star wheels, can take place.

As noted above, in one embodiment the transfer star wheels 140 are arranged to hold the containers 50 in position using suction. The star wheels 140 may have a vacuum port (not shown), formed in a channel portion, fluidly communicating with a source of vacuum (negative pneumatic pressure) via a suitable manifold. The vacuum is delivered to the vacuum ports and the surface area of the containers 50, which are exposed to the suction, is increased to a degree that the containers 50 are stably held in position as each container 50 passes below the transfer star wheel axis of rotation.

Figure 3:
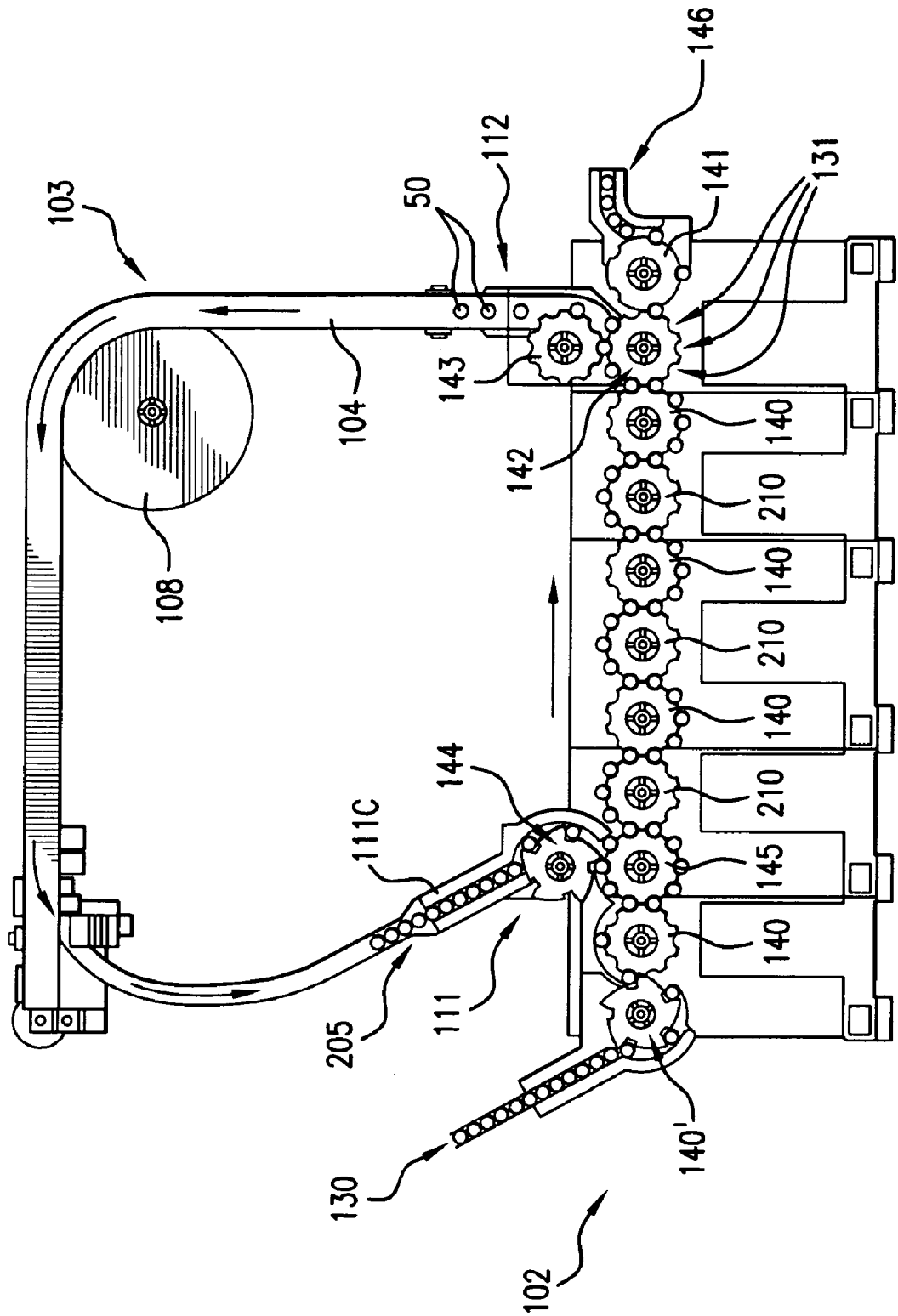
FIG. 3 is a front schematic view of the machine arrangement of FIG. 1 showing support structure.

In the embodiment shown in FIG. 3, the machine arrangement 102 comprises an infeed track 130 to feed the containers 50 into the machine arrangement 102 and a first transfer star wheel 140'. The first transfer star wheel 140' includes half as many pockets 131 as the forming star wheels 210 and other transfer star wheels 140 that are located between a recirculation discharge 111 and a recirculation entry 112. The first transfer star wheel 140' can have, for example, 4, 5, or 6 pockets 131 such that the corresponding forming star wheels 210 and other transfer star wheels 140 have 8, 10, or 12 pockets 131, respectively. Of course, any other suitable number of pockets 131 may be utilized.

Following the primary infeed, the containers 50 pass through various transfer star wheels 140 and forming turrets 210 so that the bottles undergo predetermined forming operations. As the containers 50 approach the end of the first "pass" of the machine arrangement 102, the containers 50 enter into a divider star wheel 142. The divider star wheel 142 separates the containers 50 into either a discharge path or a recirculation path depending on which set of alternating pockets 131 in which each container 50 is positioned. If the containers 50, for example only, are in odd numbered pockets 131, then the bottles pass to the discharge path via a discharge transfer star wheel 141 and then a discharge track 146. The discharge star wheel 141, like the first infeed transfer star wheel 140' may have half as many pockets 131 as the forming turret 210. If the containers 50, for example, are in even numbered pockets 131, then the containers 50 pass to the recirculation path via a recirculation restacking star wheel 143 and into the recirculation mechanism 103.

Figure 11:
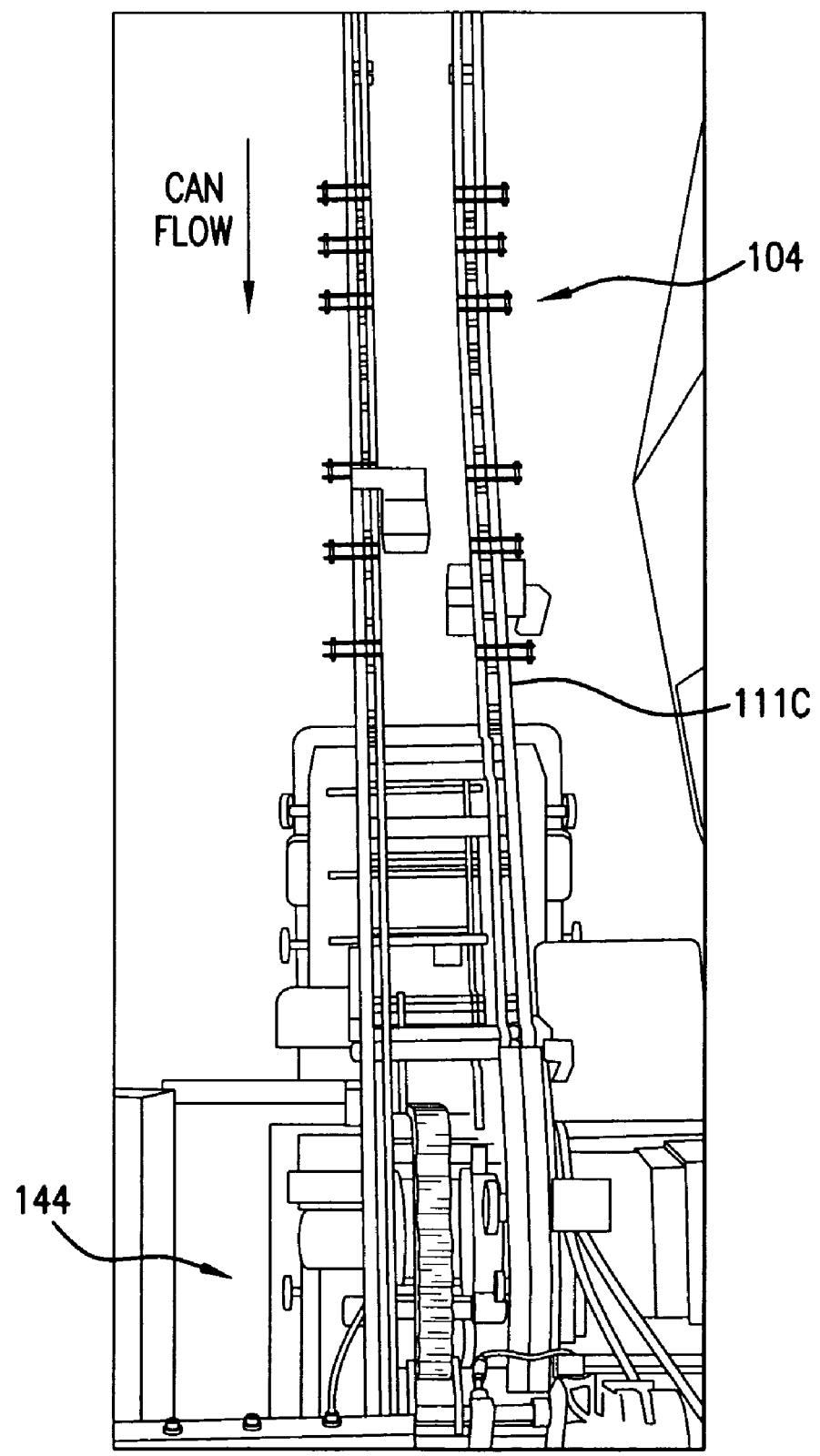
FIG. 11 is a rear perspective view of an article guide track of the recirculation conveyor system at a recirculation discharge.
Figure 12:
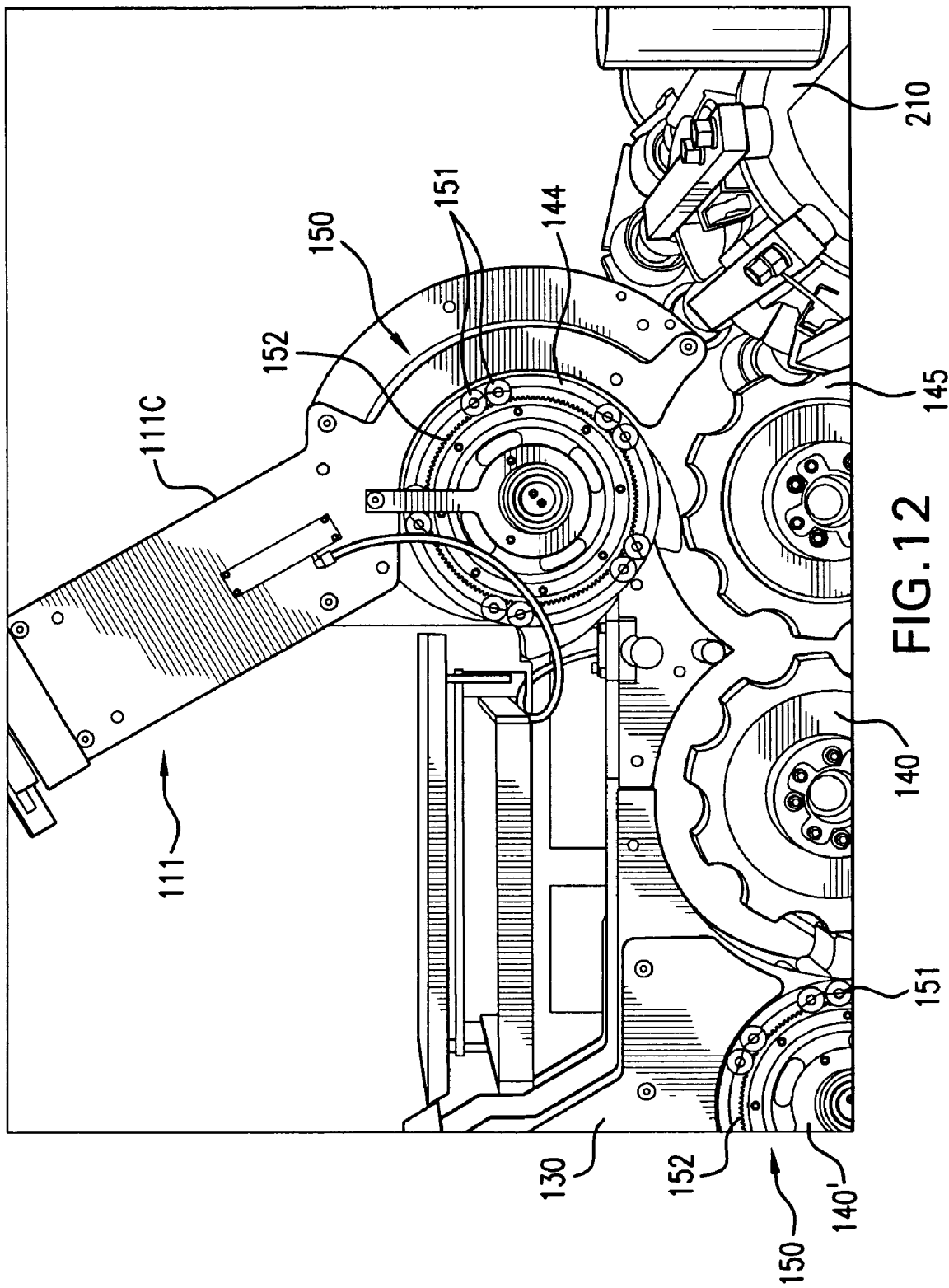
FIG. 12 illustrates a front elevation view of an article infeed and recirculation discharge according to an embodiment of the recirculation conveyor system in which a waxer assembly is shown.

In the restacking star wheel 143, the containers 50 are loaded into an article guide track 104. As can be seen in FIG. 3, the containers 50 are initially stacked vertically on the track 103. The arrows illustrate the direction in which the containers 50 move. The containers 50 pass up and back towards an upstream portion of the machine arrangement 102 and enter a recirculation supply tunnel or chute 111C in the recirculation discharge 111. An embodiment of the recirculation discharge 111 are shown in FIG. 11.

In the recirculation discharge 111, the containers 50 in the recirculation path are discharged back into the forming path. From the chute 111C, the containers 50 enter a recirculation discharge transfer star wheel 144 that places the containers 50 into another different set of alternating pockets 131 in a reentry star wheel 145. Following this, the containers 50 pass into the forming turrets 210 and transfer star wheels 140 in another different set of pockets that alternate ever other one, or every third one, or in any other suitable alternating manner. In other words, the containers 50 are now in the set of pockets 131 different from the first pass. When the containers 50 now enter the divider star wheel 142, the containers 50 in the other set of alternating pockets 131 (for example, odd numbered pockets 131) will be divided into the discharge transfer wheel 141 and into the discharge track 146. Following the discharge track 146, the containers 50 may enter a collection container, additional forming machines, or any other suitable path.

Figure 4:
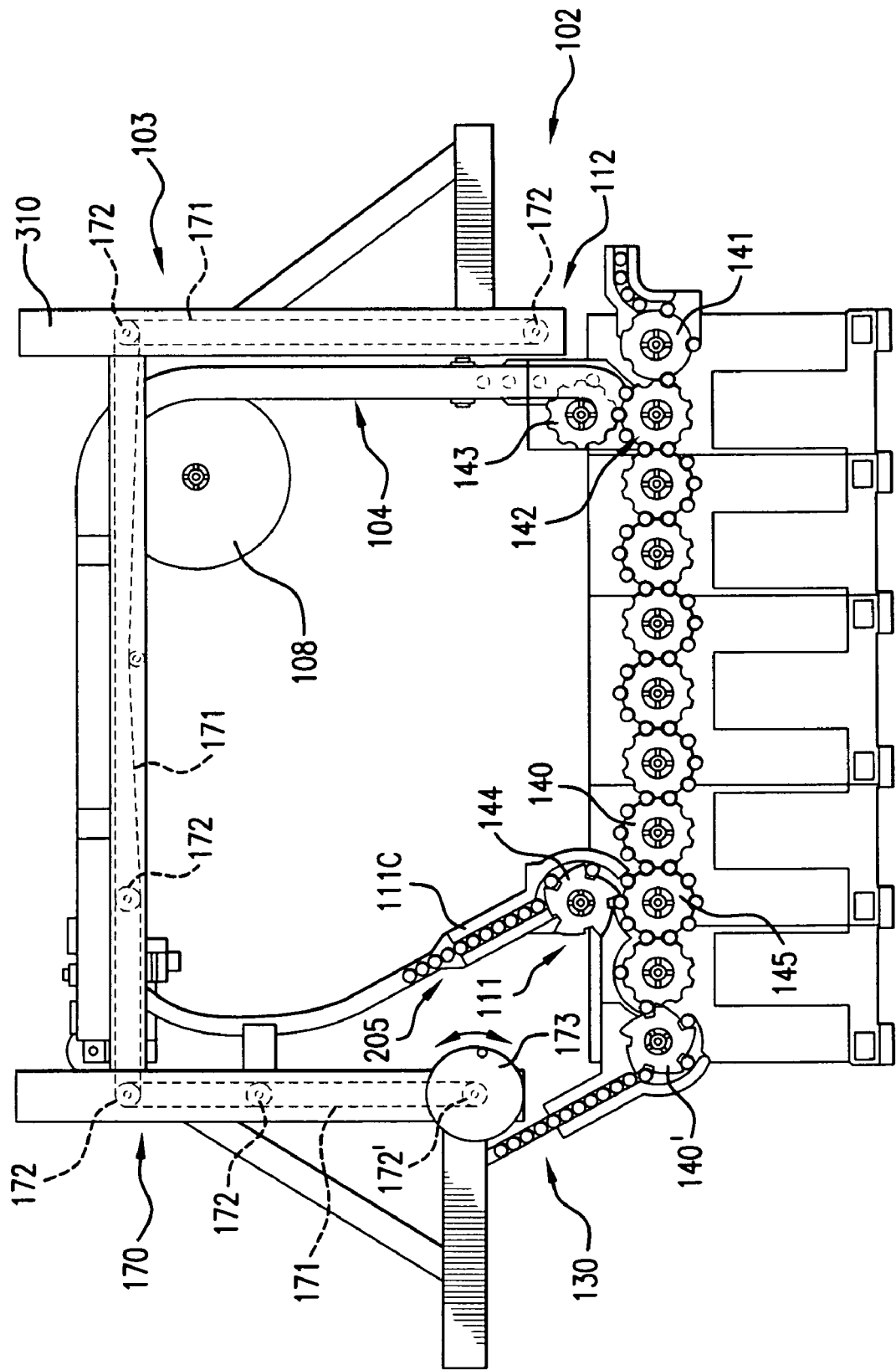
FIG. 4 is a front schematic view of the machine arrangement of FIG. 1 showing additional support structure.
Figure 5:
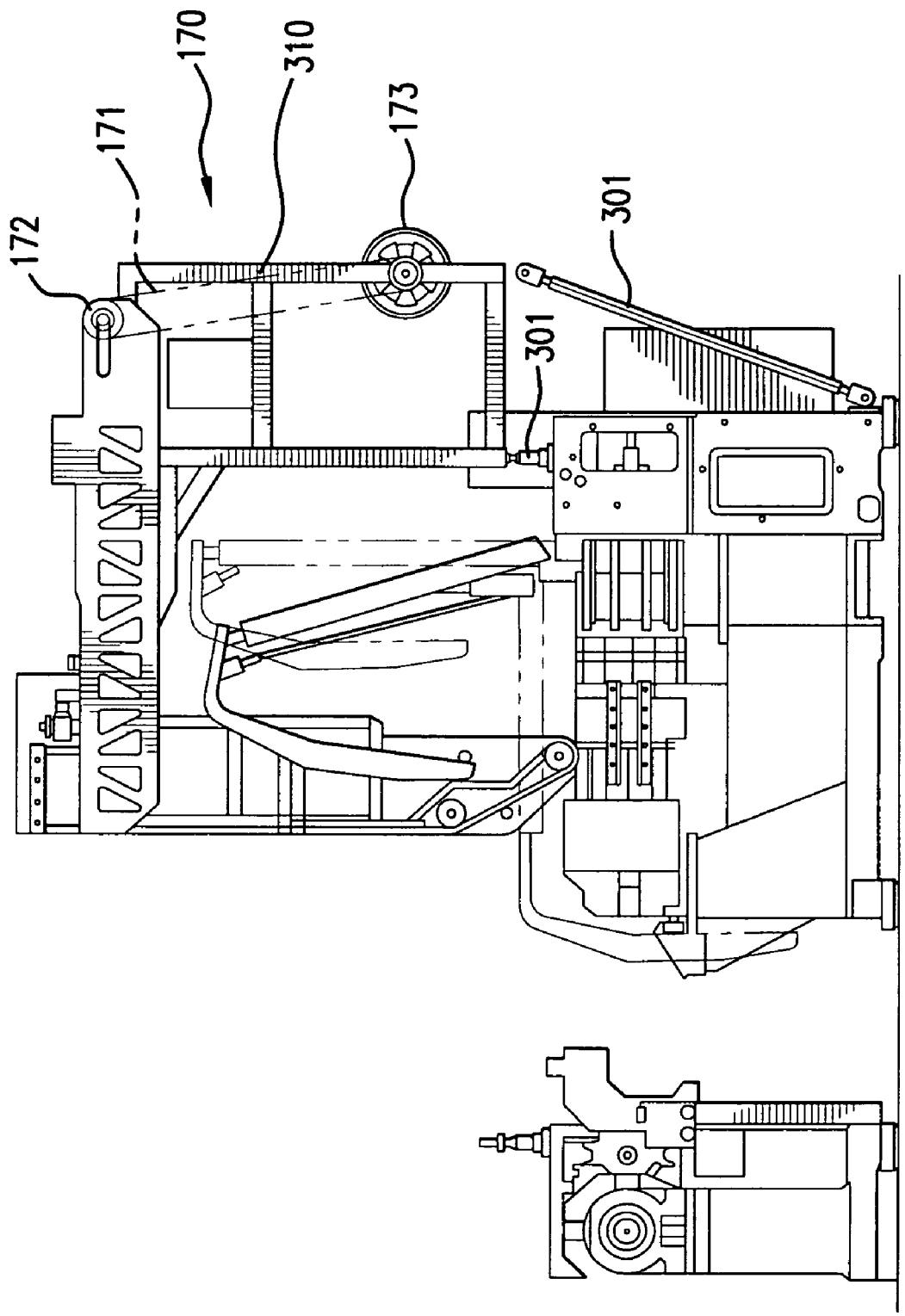
FIG. 5 is a side view of the recirculation conveyor system according to an embodiment of the invention.
Figure 6:
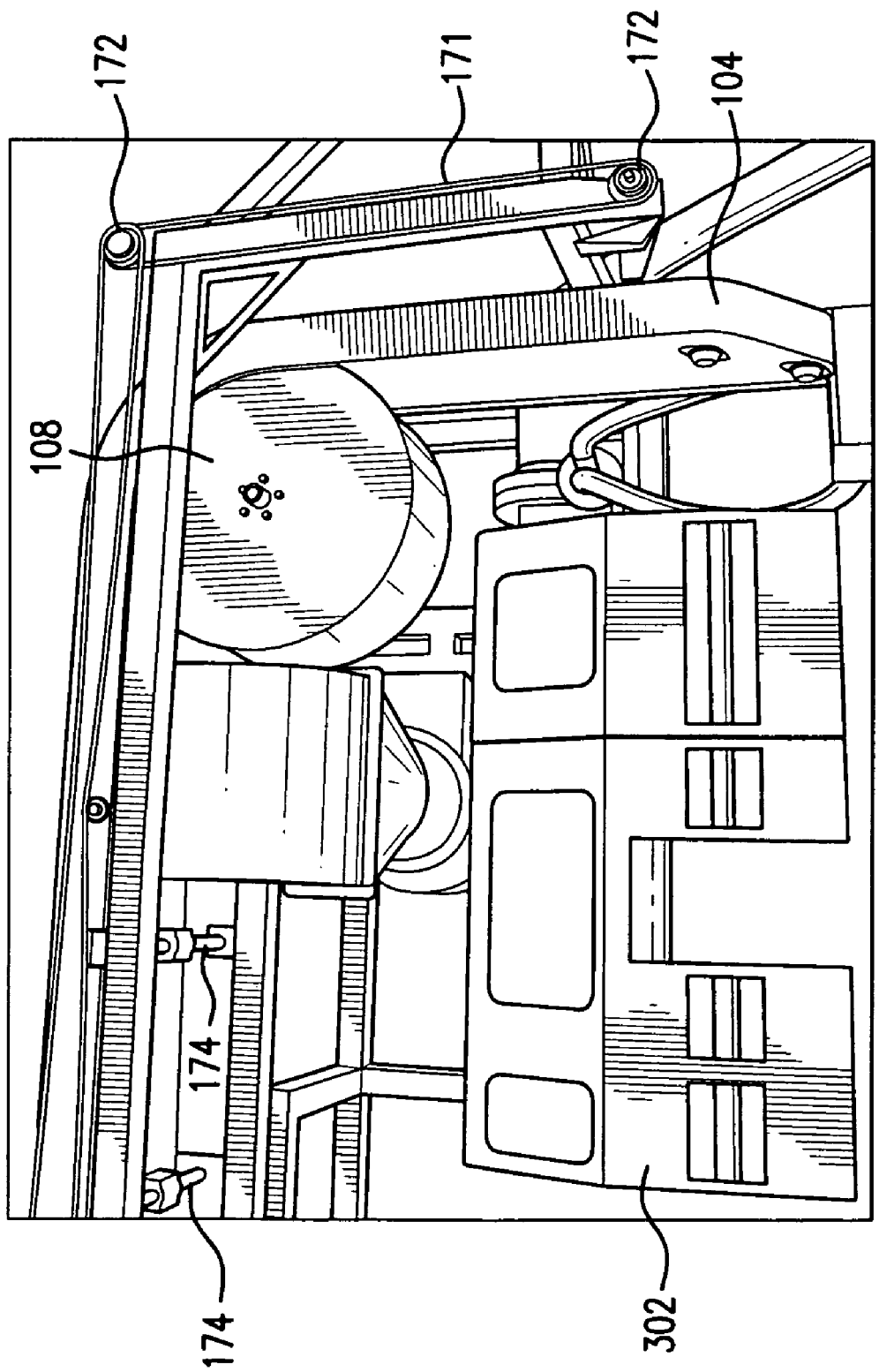
FIG. 6 is a front perspective view of the recirculation conveyor system in which turn wheels and guide track are illustrated.
Figure 9:
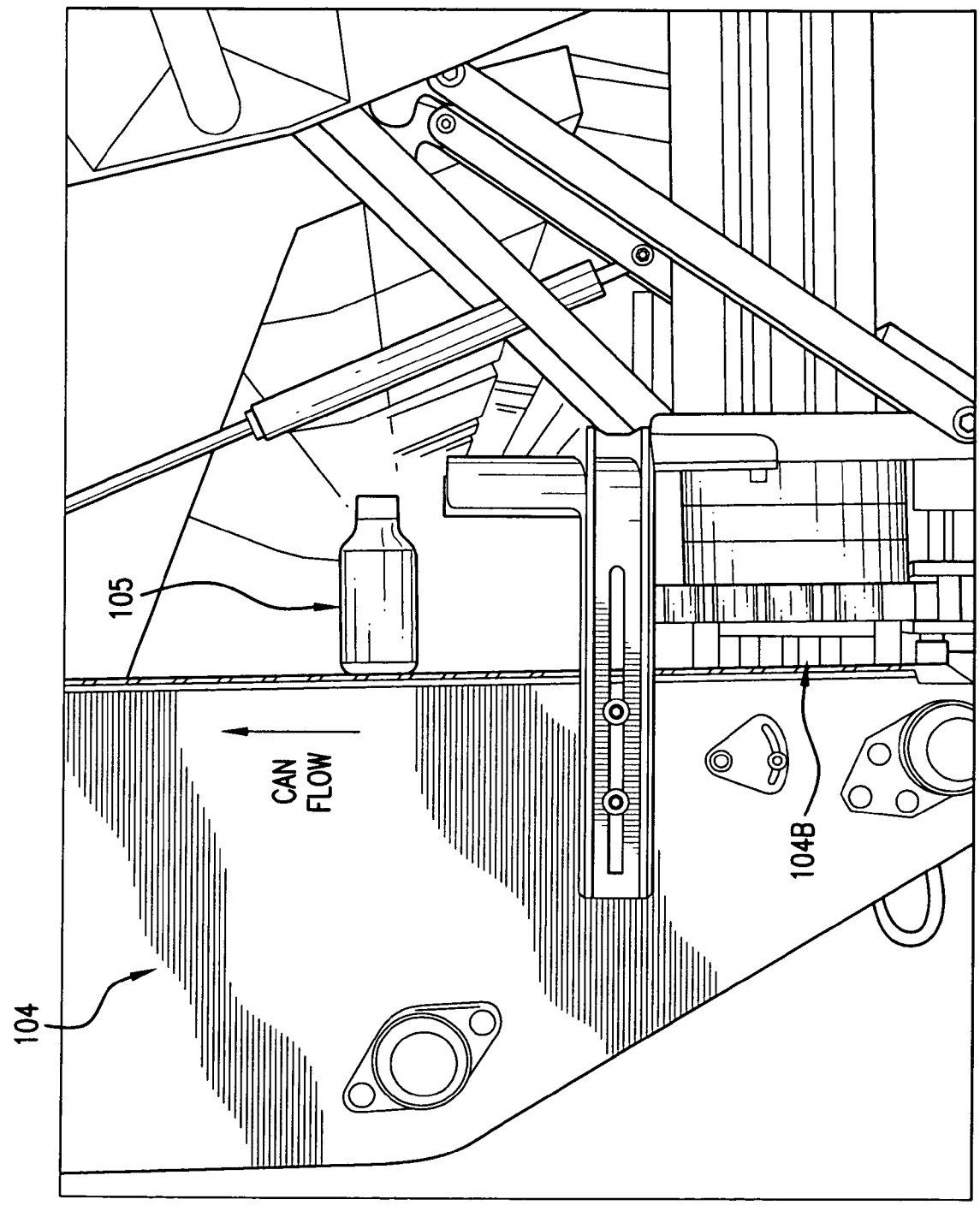
FIG. 9 is a detail side view of the recirculation infeed of FIG. 8 illustrating a conveyor belt and position of an article on the belt.
Figure 10:
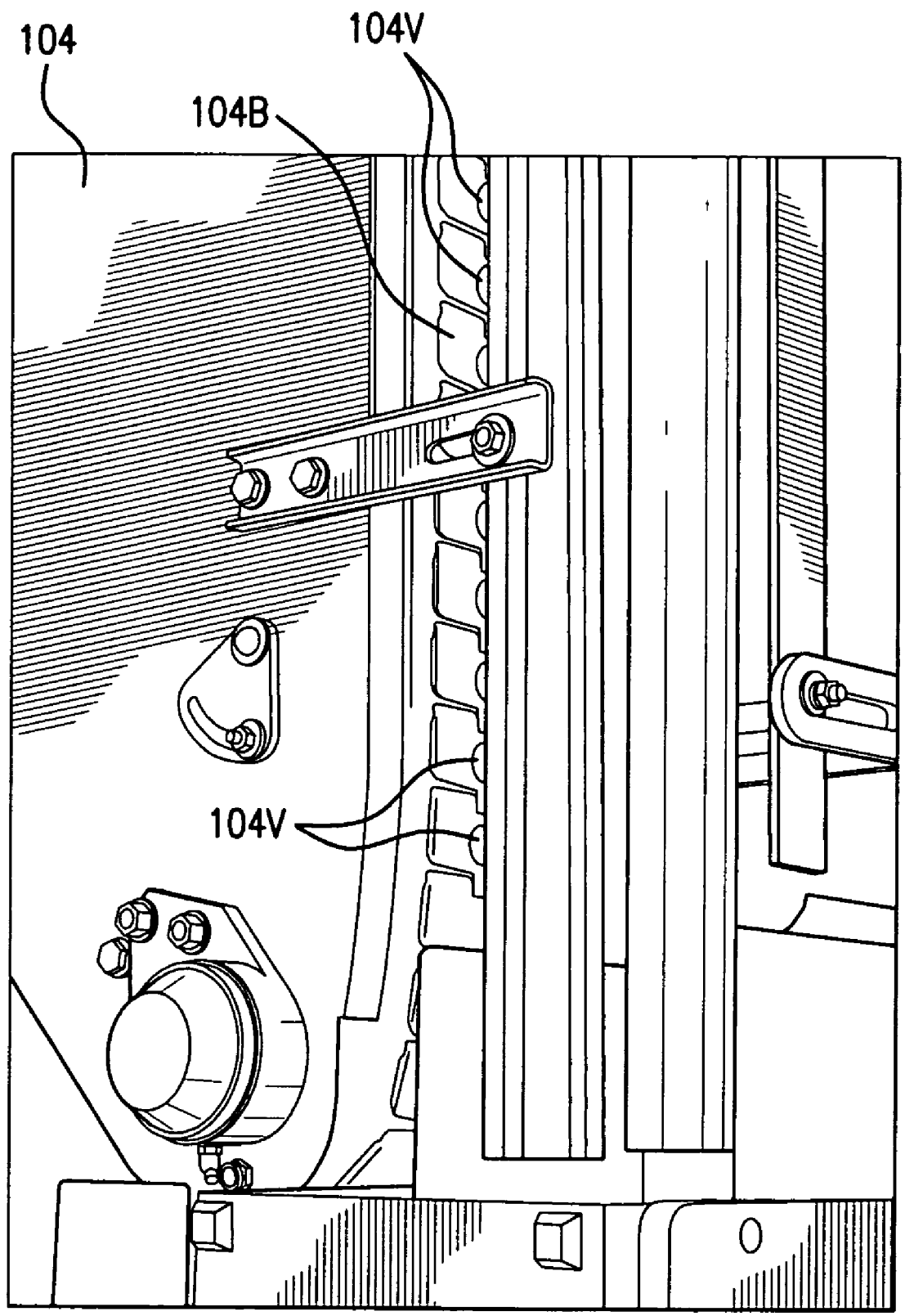
FIG. 10 is a detail side perspective view of the conveyor belt in which vacuum openings are shown.

FIG. 4 illustrates the machine arrangement 102 with the frame 310 that supports the article guide track 104 and other machines or components of the machine arrangement 102. FIG. 5 illustrates a side view of the machine apparatus with the frame 310. FIGS. 9 and 10 illustrate the article guide track 104 and the vacuum ports 104V in the track 104 to move the containers 50 in the recirculation mechanism 103.

Figure 7:
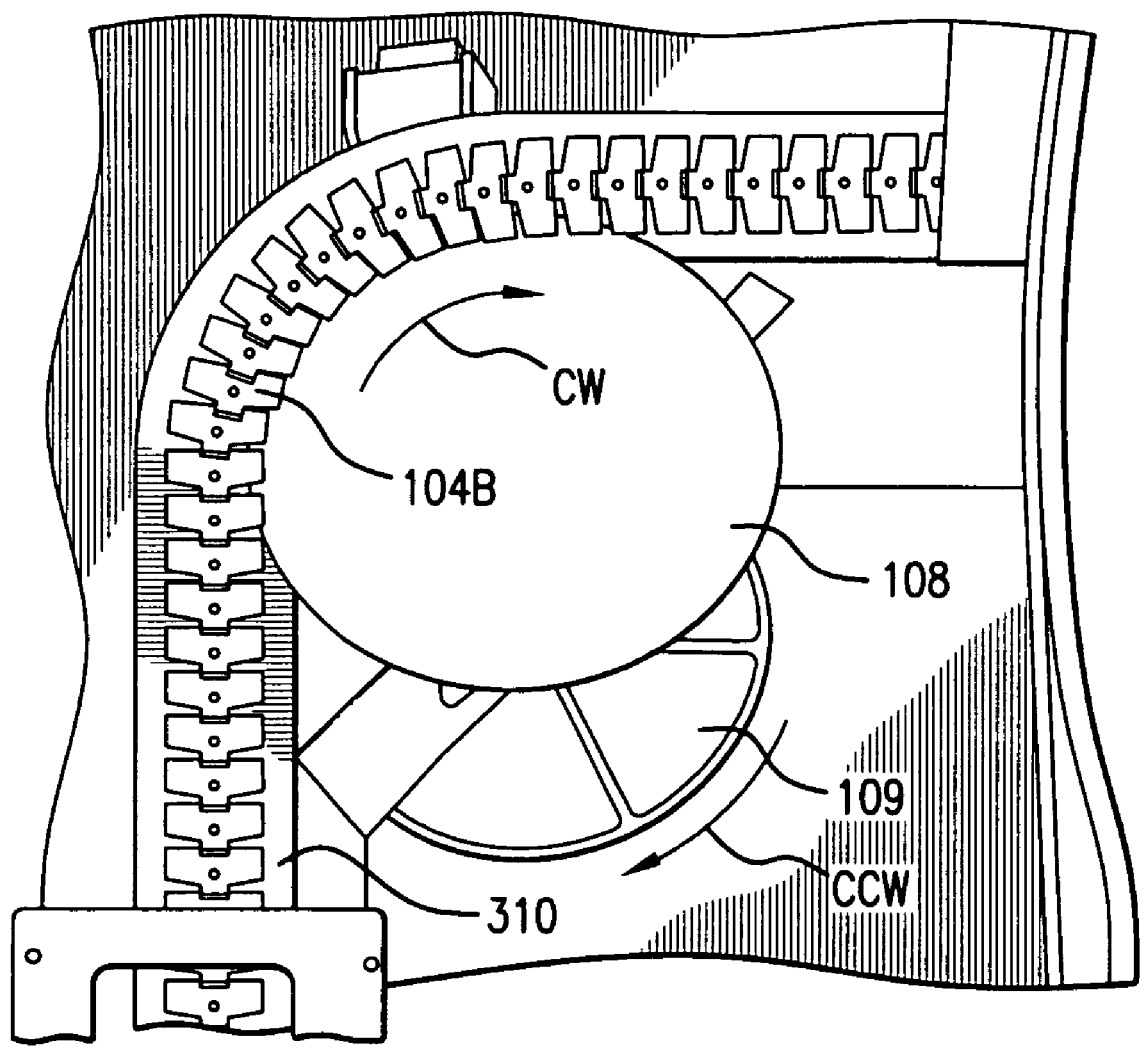
FIG. 7 is a front perspective view of the recirculation conveyor system in which the turn wheels and the guide track are illustrated.
Figure 8:
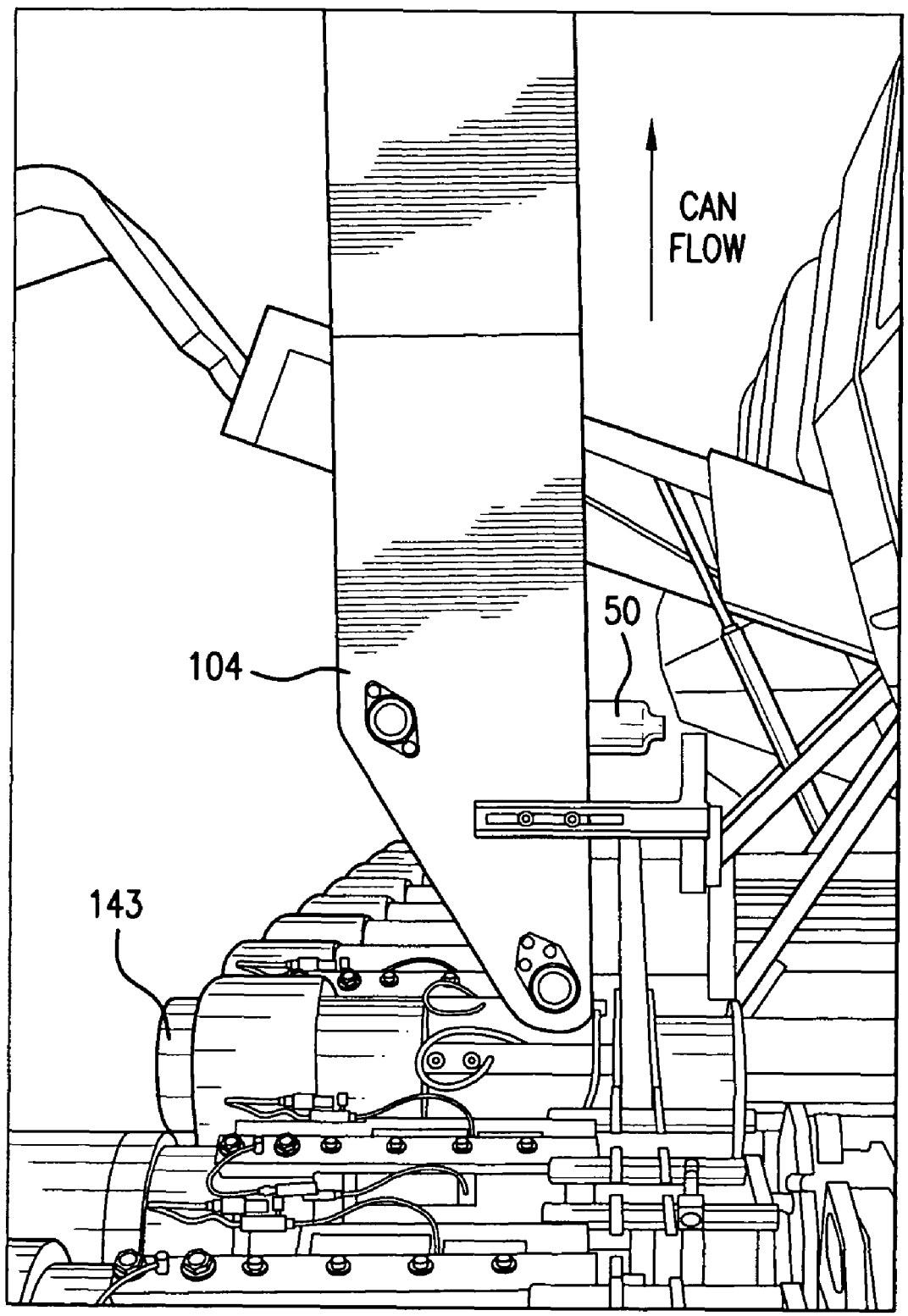
FIG. 8 is a side view of the recirculation conveyor system in which a recirculation infeed is illustrated.

The guide track 104 includes a belt 104B that moves the containers 50 from a downstream end towards an upstream end of the machine arrangement 102. In one embodiment, the guide track 104 utilizes two turn wheels 108, 109, for example (which are shown in FIG. 7) to move the belt 104B. The track 104 may be positioned such that a closed end of each container 50 is attached to the belt 104B in a vertical manner. As the belt 104B approaches the turn wheels 108, 109, the belt 104B bends around a first turn wheel 108 so that the containers 50 are now in a horizontal line. The containers 50 are moved to an upstream end and are dropped into the recirculation chute 111C to be reentered into the machine arrangement 102 via a reentry transfer wheel 145. The belt 104B is looped around such that it forms a continuous belt. The belt 104B returns to the restacking transfer wheel 143 via the second turn wheel 109.

As shown in FIGS. 9-10, the guide track 104 comprises a belt 104B that, through a vacuum, moves the containers 50 along the guide track 104 and to the recirculation discharge 111. The containers 50 are transferred from the restacking star wheel 143 to the belt 104B via a vacuum. The belt 104B contains openings 104V over which the closed end of the container 50 rests. A vacuum, via openings 104V, holds the container 50 onto the belt 104B.

In an embodiment, the belt 104B runs along a recirculation path up and over a first turn wheel. The first turn wheel 108 rotates in a first direction to move the belt 104B in a recirculation direction (towards recirculation discharge 111). The second turn wheel 109 rotates in an opposite direction to bring the belt 104B back to the recirculation infeed 112.

Alternatively, the guide track 104 could comprise an air tunnel that moves the containers 50 via air blowing the containers 50 up and along the recirculation path.

In an embodiment, the overhead recirculation mechanism 103 is movable to adjust for bottle height (length). According to an embodiment, the article guide track/conveyor 104 is capable of a quick change for varying container 50 height. The track 104 moves with respect to the frame 310.

Figure 14:
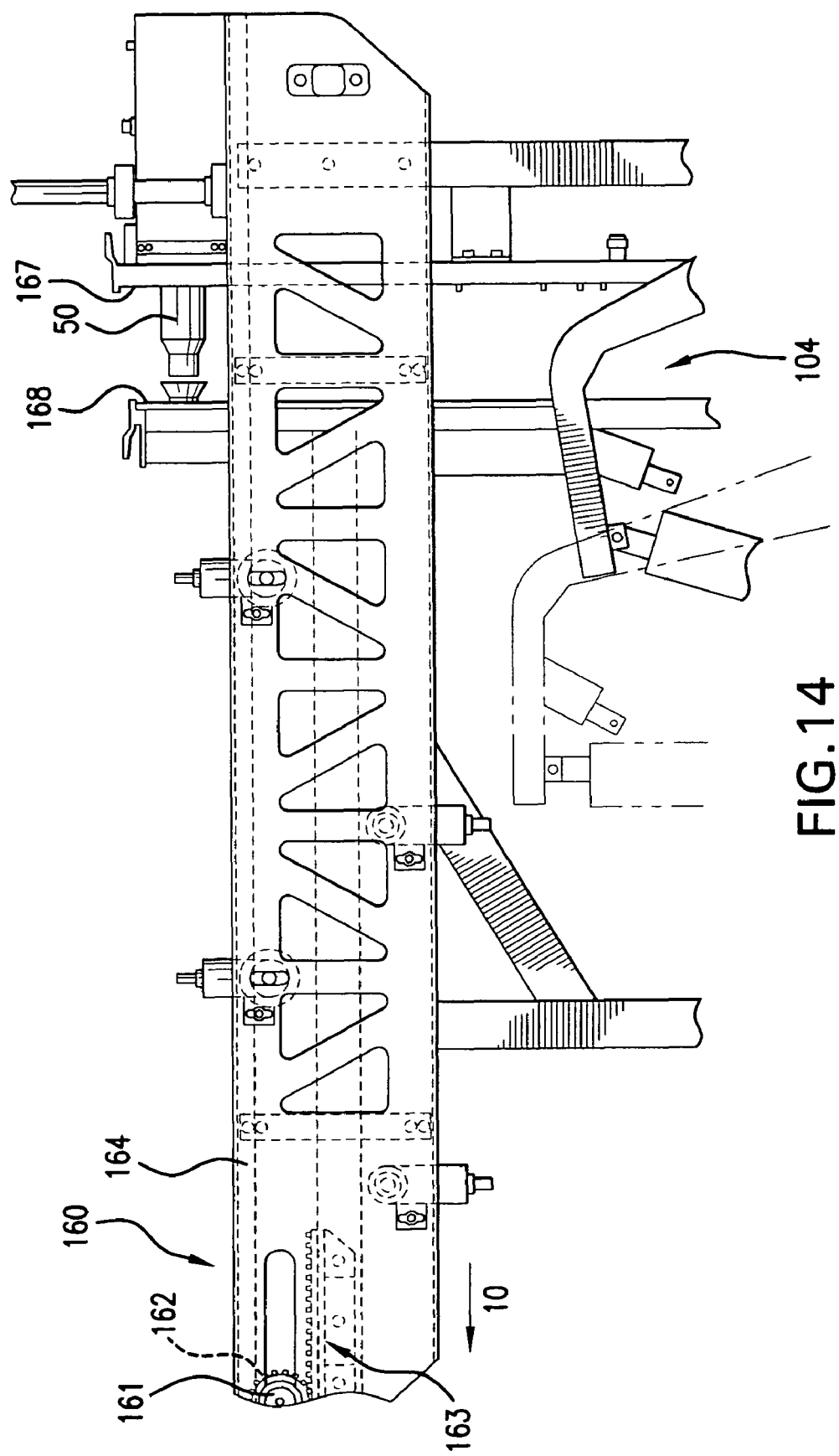
FIG. 14 is a detail side view of rack and pinion arrangement on a cantilever beam support of a track width adjustment mechanism of the recirculation conveyor system according to an embodiment of the invention.
Figure 15:
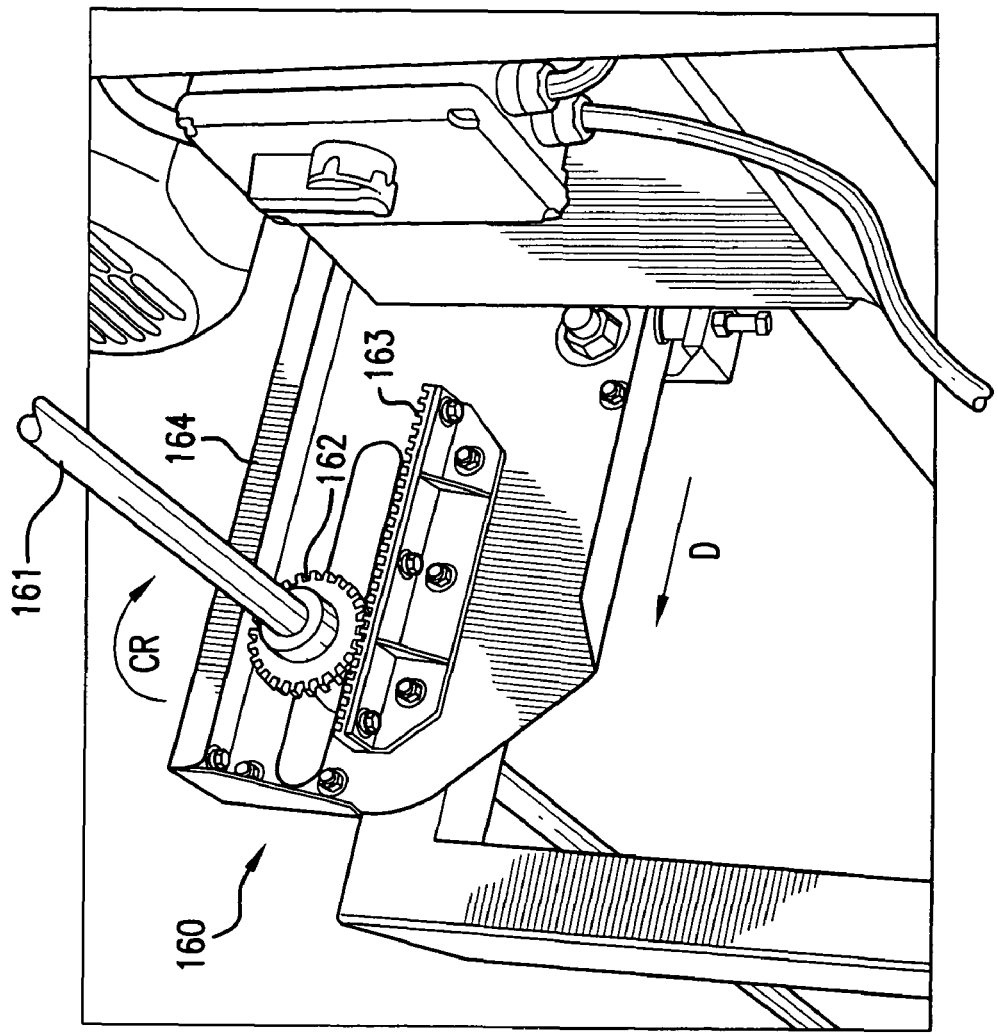
FIG. 15 is a detail side perspective view of the rack and pinion arrangement of the track width adjustment mechanism of FIG. 14.
Figure 16:
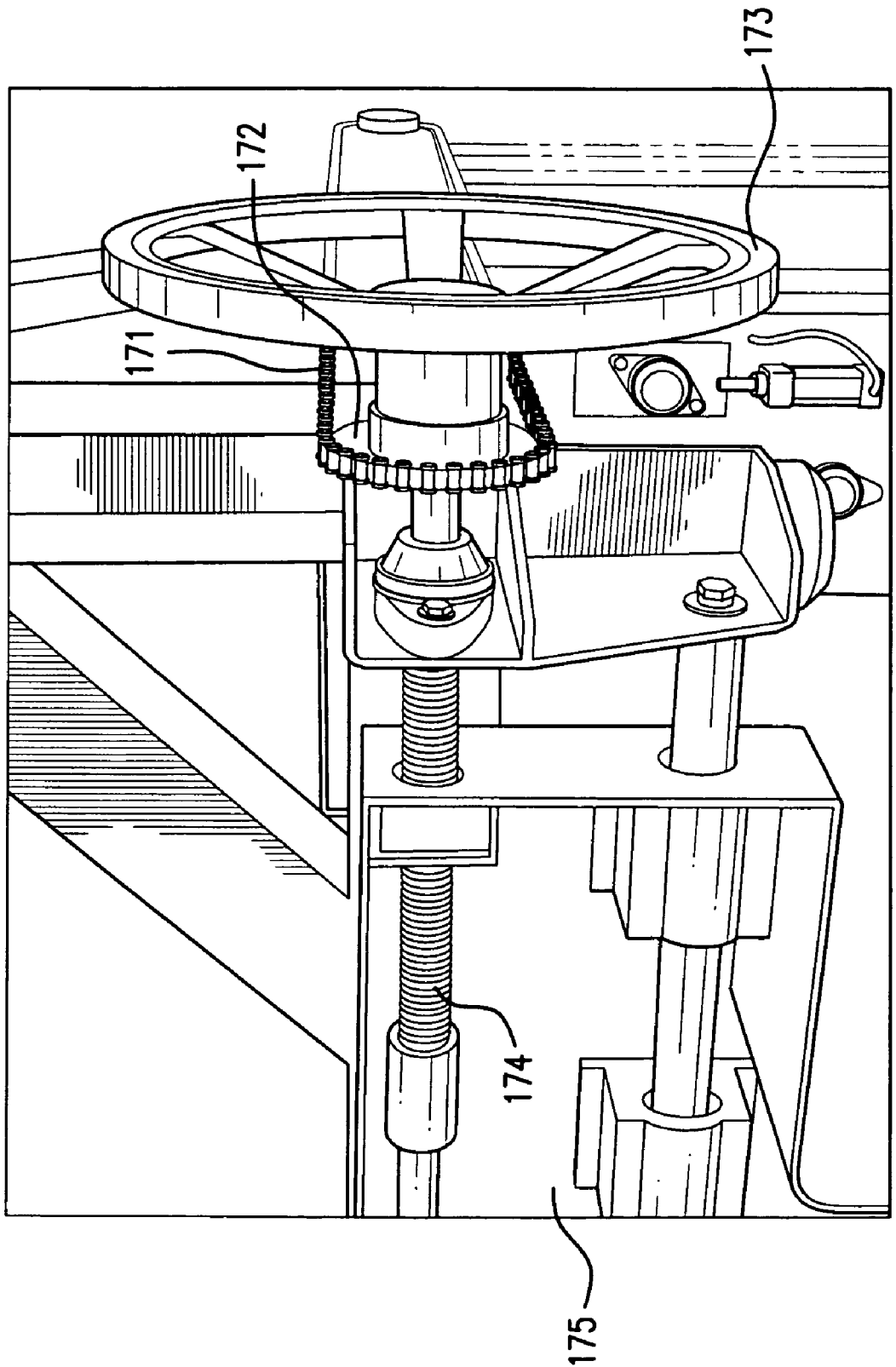
FIG. 16 is a detail perspective view of a track width adjustment mechanism according to another embodiment.
Figure 17:
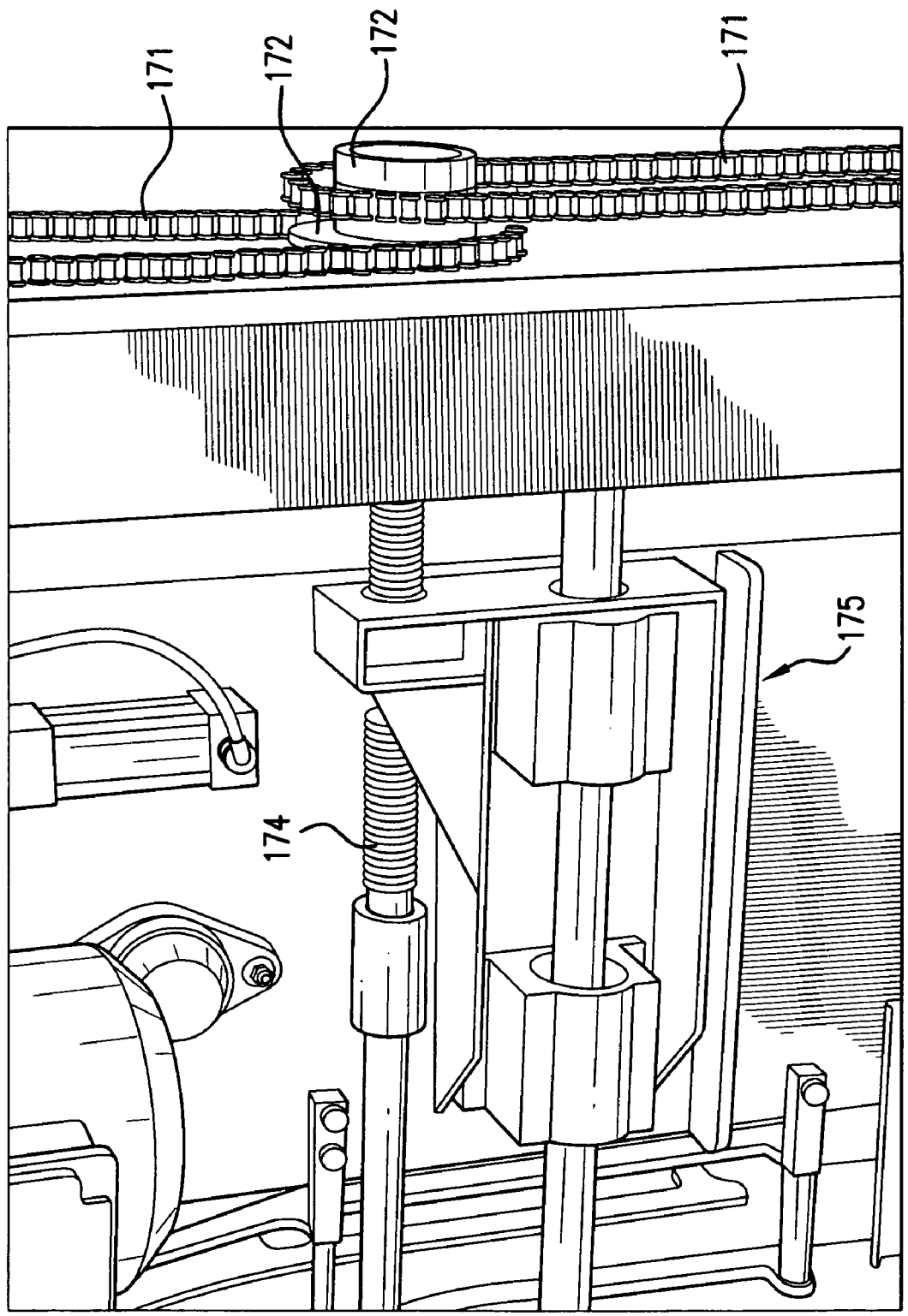
FIG. 17 is a detail perspective view of the track width adjustment mechanism of FIG. 16.

The guide track 104 is adjustable to account for varying sizes of containers 50. For example, FIGS. 14-15 illustrate a track adjustment mechanism 160 according to an embodiment of the invention. The track adjustment mechanism 160 includes a line (main) shaft 161 operably connected to one or more pinions 162. Each of one or more cantilevered beam supports 164 in the recirculation mechanism includes a pinion 162 and a rack 163. When the main shaft 161 is rotated, the shaft 161 rotates the pinion(s) 162 over the rack 163.

For example, when the shaft 161 rotates the pinion 162 in a clockwise direction CR (in FIG. 15), the pinion 162 pulls the rack 163 in a direction D to pull a first side 167 of the article guide track/conveyor 104 towards a second side 168 to shorten the width of the conveyor 104. In other words, the distance between the first and second sides 167, 168 is shortened. The side 167 of the article guide track 104 pulled in is the side 167 in the far right of FIG. 14 (on the front of the machine arrangement). By shortening or lengthening the width of the article guide track conveyor 104, the conveyor 104 is capable of moving shorter or longer containers 50.

Alternatively, the shaft 161 may be rotated in a counter-clockwise direction to allow longer containers 50 in the article guide track conveyor 104. Guide rollers may be utilized to move the article guide track 104. A hand crank may be manually moved to rotate the main shaft 161. Alternatively, a crank wheel or any other suitable mechanism may be used to rotate the main shaft 161.

FIGS. 4, 6, 16, 17 illustrate a track adjustment mechanism 170 according to another embodiment of the invention. The track adjustment mechanism 170 comprises a series of chains 171 and sprockets 172 operably connected to a crank wheel 173. By turning the crank wheel 173, a first sprocket 172' turns (shown in FIG. 4), which in turn moves the chains 171 and remaining sprockets 172. As the remaining sprockets 172 turn, a corresponding shaft 174 rotates to move a slide block arrangement 175. The slide block arrangement moves and extends the height (length) of the article guide track/conveyor 104. The crank wheel 173 may rotate in any direction to make the article guide track longer 104 or shorter depending upon the size of the containers 50.

The recirculation discharge 111, according to an embodiment, includes a container stop 205 shown in FIG. 4. The container stop 205 holds the containers 50 in the recirculation supply tunnel (chute) 111C until the recirculation supply tunnel (holding pen) 111C is full. Once the recirculation supply tunnel 111C is full, the containers 50 are discharged and fed back into the machine arrangement 102 by passing the containers 50 from a recirculation discharge transfer star wheel 144 to a reentry transfer star wheel 145. The container stop 205 may comprise a sensor that determines the number of containers 50 in the recirculation supply tunnel 111C that is operably linked to an arm or other mechanism that prevents the containers 50 from entering the recirculation discharge star wheel 144. When the sensor determines that the tunnel 111C is adequately full, the sensor sends a signal to release the arm or other mechanism to allow the containers 50 to enter the recirculation discharge star wheel 144. Of course, any other suitable container stop 205 may be utilized.

According to an embodiment of the invention, the machine arrangement with recirculation may include one, two, or more waxing stations. A plurality of waxing stations each having at least one lubrication mechanism 150 (shown in FIG. 12) are useful due to reduced diameter on returning bottles. In an embodiment, a first waxing station with a lubrication mechanism 150 may be located at the first transfer star wheel 140' and a second waxing station with a lubrication mechanism 150 may be located at the recirculation discharge star wheel 144. Without the second waxing or lubrication station, the smaller diameter on the returning bottles (second loop) may be difficult to lubricate.

For example, a waxing station may be positioned on the reentry transfer star wheel 145, primary transfer star wheel 140', an upstream portion star wheel 140, a downstream portion star wheel 140, or any other suitable star wheel.

Figure 13:
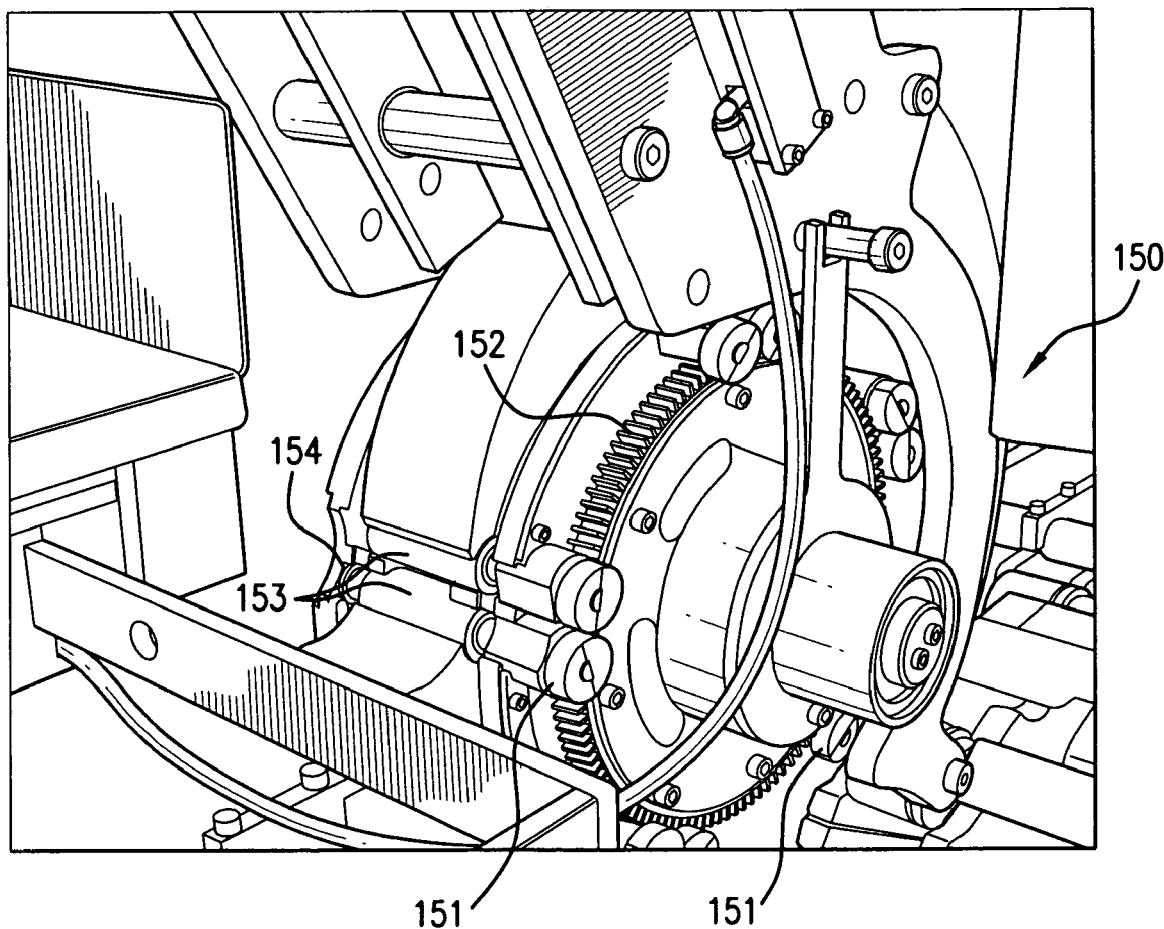
FIG. 13 is a side perspective view of a waxer assembly according to an embodiment of the invention.

The lubrication mechanism 150 (such as shown in FIG. 13) may lubricate containers 50 in the first set of pockets, second set of pockets or both sets of pockets. Further, the machine arrangement 102 may include two lubricating star wheels; a first lubricating star wheel located after the primary infeed 130 and upstream of the reentry transfer star wheel 145, and a second lubricating star wheel at or downstream of the reentry transfer star wheel 145. The recirculation discharge star wheel 144 may also be a lubricating star wheel.

In one embodiment, the lubrication mechanism 150 comprises a plurality of pinion gears 151 that rotate along a sun gear 152 on a main shaft of the star wheel. As the star wheel turns, the pinion gears rotate, causing a set of rollers 153 to rotate. The rotation of the rollers 153 rotates the container 50. The star wheel turns, the rollers 153 turn, and the container 50 turns, thus moving a portion of the outer container 50 surface against a wick 154. The wick 154, via capillary action, is lubricated with a lubricant, such as mineral oil, wax, or any other suitable material. A reservoir can be filled with the lubricant and the wick 154 is directly or operably connected to the reservoir. The wick 154 may be a sponge or any other suitable material. The rollers 153 may be urethane coated rubber.

The lubrication mechanism 150 may also include a heater to heat the lubricant. For example, if wax is used, the wax should be melted prior to application to the containers 50. Thus, the heater melts the wax in the reservoir to a liquid state.

In an embodiment, a top portion of the open end of the container 50 is lubricated. The inside of the container 50 does not receive lubricant. Alternatively, additional portions of the container 50 may be lubricated.

A lubrication mechanism 150 may be part of two star wheels: the primary infeed transfer star wheel 140' and the recirculation discharge transfer star wheel 144. In an embodiment, two lubrication mechanisms 150 are provided such that the containers 50 receive lubrication when initially entering the machine arrangement 102, and the containers 50 receive a second application of lubrication prior to entering the machine arrangement 102 for a second time following recirculation. The lubrication mechanism 150 does not need to be on the primary star wheel 140' and the recirculation discharge star wheel 144, but any other suitable star wheels 140 or turrets.

In an embodiment, the lubrication mechanism 150 at the recirculation infeed (recirculation discharge star wheel 144) may be different than the lubrication mechanism 150 at the article infeed (primary star wheel 140') in order for the lubrication mechanism 150 of the recirculation infeed to process a modified surface of a can 50. For example, in one embodiment, the rollers 153 of the recirculation infeed lubrication mechanism 150 may have a different diameter than rollers 153 of the article infeed lubrication mechanism 150. The different size roller 153 diameter can correspond to the modified surface of the cans 50.

In another embodiment, the lubrication mechanism 150 may utilize movable brushes, lubrication drip system, or any other mechanism to lubricate the cans 50 as appropriate.

According to one embodiment, the recirculation apparatus may include a strobe light to trouble shoot the recirculation and processing of the bottles. The light can be timed with the movement of the bottles.

According to an embodiment, the recirculation apparatus may include vibration isolators 301, such as shown in FIG. 5.

In an embodiment, the recirculation apparatus may include a cover or doors 302 (shown in FIG. 6) that may be moved over the modules 110 during operation of the apparatus and when the apparatus is not in use.

According to embodiments of the invention, a machine can perform twice as many processes per stage with recirculation, thereby potentially reducing the cost and/or size of the machine required to complete a multi-stage process. The recirculation apparatus can cut down the total number of machines, but there could be reduced throughput to some degree (not as fast as a non-recirculated arrangement with a large number of machines).

While the invention is not so limited, embodiments of the invention are such that forming turrets or machines 210 may be constructed as modules. The use of bottle forming modules allows for the machine arrangement 102 to be assembled and/or changed to provide as many bottle forming stages as is required and to allow for the addition of additional stages such as flanging, necking, trimming, expansion, threading, curling, and/or base reforming/reprofiling, which may be added/removed as desired.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention.

What is claimed is:

1. A machine arrangement which operates on a plurality of articles comprises:
    a plurality of machines arranged to cooperate in a manner to form a machine arrangement, the plurality of machines including a downstream machine and one or more machines upstream of the downstream machine, and wherein at least one of the machines comprises at least a first and a second means for modifying the articles by at least one of moving, holding, manipulating, and shaping the articles as the articles pass from an article infeed to an article discharge of the machine arrangement and move along a path having a predetermined configuration;
    means for recirculating articles within the machine arrangement, the means for recirculating articles moving the articles from the downstream machine, after a first pass where the articles are subjected to the first means for modifying the articles, and recirculating the articles, in a recirculation path, to one of the one or more upstream machines so that the articles which are recirculated through the recirculation path are subjected to the second means for modifying the articles;

means for applying lubrication to the articles entering the machine arrangement at the article infeed; and means for applying lubrication to the articles in the recirculation path, comprising a starwheel in the recirculation path that applies lubricant to the articles.

2. The machine arrangement of claim 1, wherein the means for recirculating articles includes a means for adjusting size such that the machine arrangement is configured to accommodate articles of varying sizes.

3. The machine arrangement of claim 2, wherein the means for adjusting size comprises a chain and sprocket arrangement which simultaneously rotates threaded members to vary a width of an article guide track.

4. The machine arrangement of claim 2, wherein the means for adjusting size comprises a rack and pinion arrangement.

5. The machine arrangement of claim 4, wherein the rack and pinion arrangement includes at least one crank wheel operably connected to a line shaft and a plurality of racks and pinions, and wherein upon the turning of the line shaft via the crank wheel, the pinions simultaneously rotate to move the corresponding racks forwards and/or backwards to vary a width of an article guide track.

6. The machine arrangement of claim 5, wherein the pinions are operably connected to the line shaft and the racks are operably connected to cantilevered beams of the article guide track.

7. A method of recirculating articles in a machine arrangement comprises:
feeding a plurality of articles into a first set of alternating pockets in a processing turret in a machine arrangement;
performing a first process on the articles;
moving the articles to a second turret or transfer star wheel in the machine arrangement and keeping the articles in a corresponding first set of alternating pockets;
transferring the articles from the first set of alternating pockets to a recirculation conveyor;
conveying the articles from the recirculation conveyor to a recirculation chute;
feeding the articles via a secondary infeed to the machine arrangement to a second set of alternating pockets different from the first set of alternating pockets;
performing a different process on the articles in the second set of alternating pockets;
applying a lubricant to the articles before performing the first process on these articles;
applying a lubricant via a starwheel to the articles in the recirculation chute; and
conveying articles in a set of alternating pockets that is not the first set of alternating pockets to a discharge.

8. A machine arrangement which operates on a plurality of articles comprises:
a plurality of machines arranged to cooperate in a manner to form a machine arrangement, the plurality of machines including a downstream machine and one or more machines upstream of the downstream machine, and wherein at least one of the machines comprises at least a first and a second mechanism configured to modify the articles by at least one of moving, holding, manipulating, and shaping the articles as the articles pass from an article infeed to an article discharge of the machine arrangement and move along a path having a predetermined configuration;
a recirculation mechanism configured to recirculate articles within the machine arrangement, the recirculation mechanism configured to move the articles from the downstream machine, after a first pass where the articles are subjected to the first mechanism configured to modify the articles, and recirculating the articles, in a recirculation path, to one of the or more of the upstream machines so that the articles which are recirculated through the recirculation path are subjected to the second mechanism configured to modify the articles;
a first lubrication mechanism configured to apply lubrication to the articles entering the machine arrangement at the article infeed; and
a second lubrication mechanism configured to apply lubrication to the articles in the recirculation path, comprising a starwheel in the recirculation path that applies lubricant to the articles.

9. The machine arrangement of claim 8, wherein the recirculation mechanism includes an article guide track which transfers the articles from the downstream machine to one of the one or more upstream machines.

10. The machine arrangement of claim 9, wherein the article guide track comprises a track width adjusting arrangement configured to adjust the track width of the article guide track to accommodate varying article sizes.

11. The machine arrangement of claim 10, wherein the track width adjusting arrangement comprises a chain and sprocket arrangement which simultaneously rotates threaded members to vary a width of an article guide track.

12. The machine arrangement of claim 10, wherein the track width adjusting arrangement comprises a rack and pinion arrangement.

13. The machine arrangement of claim 12, wherein the rack and pinion arrangement includes at least one crank wheel operably connected to a line shaft and a plurality of racks and pinions, and wherein upon the turning of the line shaft via the crank wheel, the pinions simultaneously rotate to move the corresponding racks forwards and/or backwards to vary a width of an article guide track.

14. The machine arrangement of claim 13, wherein the pinions are operably connected to the line shaft and the racks are operably connected to cantilevered beams of the article guide track.

* * * * *